(12) United States Patent
Kanemoto

(10) Patent No.: US 9,389,078 B2
(45) Date of Patent: Jul. 12, 2016

(54) GYRO SENSOR AND ELECTRONIC APPARATUS

(71) Applicant: Seiko Epson Corporation, Tokyo (JP)

(72) Inventor: Kei Kanemoto, Suwa (JP)

(73) Assignee: Seiko Epson Corporation (JP)

( * ) Notice: Subject to any disclaimer, the term of this patent is extended or adjusted under 35 U.S.C. 154(b) by 505 days.

(21) Appl. No.: 13/856,578

(22) Filed: Apr. 4, 2013

(65) Prior Publication Data

US 2013/0263664 A1 Oct. 10, 2013

(30) Foreign Application Priority Data

Apr. 10, 2012 (JP) .................. 2012-089058

(51) Int. Cl.
 *G01C 19/56* (2012.01)
 *G01C 19/5762* (2012.01)
 *G01C 19/5747* (2012.01)

(52) U.S. Cl.
 CPC ........ *G01C 19/5762* (2013.01); *G01C 19/5747* (2013.01)

(58) Field of Classification Search
 CPC .................. G01C 19/5747; G01C 19/5762
 USPC ........................................ 73/504.12
 See application file for complete search history.

(56) References Cited

U.S. PATENT DOCUMENTS

| | | | |
|---|---|---|---|
| 2008/0276706 A1* | 11/2008 | Hartmann et al. | 73/504.04 |
| 2011/0154898 A1* | 6/2011 | Cazzaniga et al. | 73/504.12 |
| 2012/0210789 A1 | 8/2012 | Kanemoto | |
| 2012/0291548 A1 | 11/2012 | Kanemoto | |

FOREIGN PATENT DOCUMENTS

| | | |
|---|---|---|
| JP | 2010-266321 A | 11/2010 |
| JP | 2012173055 A | 9/2012 |
| JP | 2012242240 A | 12/2012 |
| JP | 2012242286 A | 12/2012 |

* cited by examiner

*Primary Examiner* — John Chapman, Jr.
(74) *Attorney, Agent, or Firm* — Harness, Dickey & Pierce, P.L.C.

(57) ABSTRACT

A gyro sensor includes a first detection mass unit provided with a drive mass unit, a drive unit, a first detection unit and a first vibrating body; and a second detection mass unit provided with a second detection unit and a second vibrating body, the first vibrating body extends in the direction of the first axis and one end thereof is connected to the first detection mass unit, the second vibrating body extends in a direction that is opposite to an extension direction of the first vibrating body, and one end thereof is connected to the second detection mass unit, and the vibrating bodies vibrate in the direction of a third axis, along with the vibration in the direction of the first axis.

14 Claims, 13 Drawing Sheets

GYRO SENSOR AND ELECTRONIC APPARATUS

BACKGROUND

1. Technical Field

The present invention relates to a gyro sensor and an electronic apparatus.

2. Related Art

In recent years, a gyro sensor which detects an angular velocity has been largely used for controlling the posture such as in a blurring correction of a car navigation system and a video camera. In such a gyro sensor, there have been sensors which include a detection element capable of detecting the angular velocity around an X axis, a Y axis, and a Z axis perpendicular to one another.

A gyro sensor disclosed in JP-A-2010-266321 is a multi-axes angular velocity sensor that detects the angular velocity with respect to first to third detection axes perpendicular to one another, and includes a first vibration type angular velocity sensor element that detects the angular velocity with respect to the first detection axis, a second vibration type angular velocity sensor element that detects the angular velocity with respect to the second detection axis, a third vibration type angular velocity sensor element that detects the angular velocity with respect to the third detection axis, an IC that controls the first to third vibration type angular velocity sensor elements, and a package that accommodates the first to third vibration type angular velocity sensor elements and the IC, wherein a vibration plane of the first vibration type angular velocity sensor element is parallel to the first detection axis, a vibration plane of the second vibration type angular velocity sensor element is parallel to the second detection axis, and a vibration plane of the third vibration type angular velocity senor element is perpendicular to the third detection axis.

However, in the gyro sensor of the related art, since individual elements are individually placed for each axis so as to detect the angular velocity around three axes, a mounting area has increased, and thus the miniaturization has been difficult. Furthermore, since the drive vibration is independent of each element, there has been a need to provide a drive circuit for each element, the mounting area is increased and the miniaturization is difficult.

SUMMARY

An advantage of some aspects of the invention is to provide a gyro sensor capable of promoting the miniaturization. Another advantage of some aspects of the invention is to provide an electronic apparatus including the above-mentioned gyro sensor.

The invention can be implemented as the following forms or application examples.

Application Example 1

This application example is directed to a gyro sensor that includes a structure having: a drive mass unit; a drive unit that drives the drive mass unit in a direction of a first axis; a first detection mass unit that is provided with a first detection unit and a first vibrating body, and is connected to the drive mass unit, via a first elastic portion capable of being displaced in a direction of a second axis perpendicular to the first axis; and a second detection mass unit that is provided with a second detection unit and a second vibrating body, and is connected to the drive mass unit, via a second elastic portion capable of being displaced in a direction of the second axis, wherein the first vibrating body extends in the direction of the first axis and one end thereof is connected to the first detection mass unit, the second vibrating body extends in a direction opposite to an extension direction of the first vibrating body and one end thereof is connected to the second detection mass unit, and the first vibrating body and the second vibrating body vibrate in a direction of a third axis perpendicular to the first axis and the second axis along with the vibration in the direction of the first axis.

According to such a gyro sensor, since the first vibrating body and the second vibrating body are included which vibrate in the direction of the third axis along with the vibration in the direction of the first axis, it is possible to detect the angular velocity around the axis of the first axis by setting the drive vibration in the third axis direction of the first vibrating body and the second vibrating body as the drive vibration. Thus, by the use of the gyro sensor, the detection of the angular velocity around the axis of the first axis and the detection around at least one of the axis of the second axis and the third axis can be performed by the same drive vibration in the direction of the first axis. Furthermore, there is no need to provide the drive circuit for each element, and thus the miniaturization of the device can be promoted. Furthermore, the mounting area can be reduced, and thus the miniaturization of the device can be promoted.

In addition, in such a gyro sensor, since the extension direction of the first vibrating body is opposite to the extension direction of the second vibrating body, the first vibrating body and the second vibrating body vibrate at the phases that are opposite to each other in the direction of the third axis. Thereby, the first detection mass unit and the second detection mass unit are displaced in the opposite directions each other by the angular velocity around the axis of the first axis, and are displaced in the same direction by the angular velocity around the axis of the third axis or the acceleration in the direction of the second axis. Thus, it is possible to cancel errors, which are generated by the angular velocity around the axis of the third axis or the acceleration in the direction of the second axis, by the signal processing, and thus the detection accuracy of the angular velocity around the axis of the first axis can be increased.

Application Example 2

In the gyro sensor according to the application example, two of the structures may be placed in the direction of the first axis, the two structures may be connected to each other by a connecting elastic portion, and the drive unit may vibrate the drive mass units of the two structures at the phases opposite to each other.

According to such a gyro sensor, a Q value can be increased.

Application Example 3

In the gyro sensor according to the application example, the first detection mass unit and the second detection mass unit may be displaced in directions opposite to each other by the angular velocity around the axis of the first axis, and may be displaced in the same direction by the acceleration in the direction of the second axis or by the angular velocity around the axis of the third axis.

According to such a gyro sensor, since it is possible to cancel the errors, which are generated by the angular velocity around the axis of the third axis or the acceleration in the direction of the second axis, by the signal processing, the detection accuracy of the angular velocity around the axis of the first axis can be increased.

Application Example 4

In the gyro sensor according to the application example, the drive mass unit may be provided at a predetermined distance from a substrate, and may have a first fixed substrate fixed to the substrate, and a second fixed substrate fixed to the substrate.

According to such a gyro sensor, it is possible to sensitively detect the angular velocity around the axis of the first axis.

Application Example 5

The gyro sensor according to the application example may output a first detection signal that fluctuates based on the displacement of the first detection unit, may output a second detection signal that fluctuates based on the displacement of the second detection unit, and may detect the angular velocity around the axis of the first axis, based on the first detection signal and the second detection signal.

According to such a gyro sensor, since it is possible to cancel the errors generated by the angular velocity around the axis of the third axis or the acceleration in the direction of the second axis, the detection accuracy of the angular velocity around the axis of the first axis can be increased.

Application Example 6

In the gyro sensor according to the application example, the structure may have a third detection unit that detects at least one of the angular velocity around the axis of the second axis and the angular velocity around the axis of the third axis.

According to such a gyro sensor, since it is possible to perform the detection of the angular velocity around the axis of the first axis and the detection of the angular velocity around at least one axis of the second axis and the third axis by the same drive vibration in the direction of the first axis, it is possible to perform the detection of the angular velocity of other axes (the second axis and the third axis) in addition to the angular velocity around the axis of the first axis, while promoting the miniaturization.

Application Example 7

In the gyro sensor according to the application example, a frequency adjustment unit may be provided in at least one of the first vibrating body and the second vibrating body.

According to such a gyro sensor, it is possible to adjust the resonance frequency of at least one of the first vibrating body and the second vibrating body.

Application Example 8

An electronic apparatus according to this application example includes the gyro sensor according to any one of the application example.

According to such an electronic apparatus, since the electronic apparatus includes the gyro sensor according to any one of Application Examples 1 to 7, the miniaturization can be promoted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail using the drawings. In addition, the embodiments described below do not unfairly limit the contents of the invention described in the appended claims. Furthermore, all the configurations described below may not be the required constitution requirements.

1. Configuration of Gyro Sensor

Figure 1:
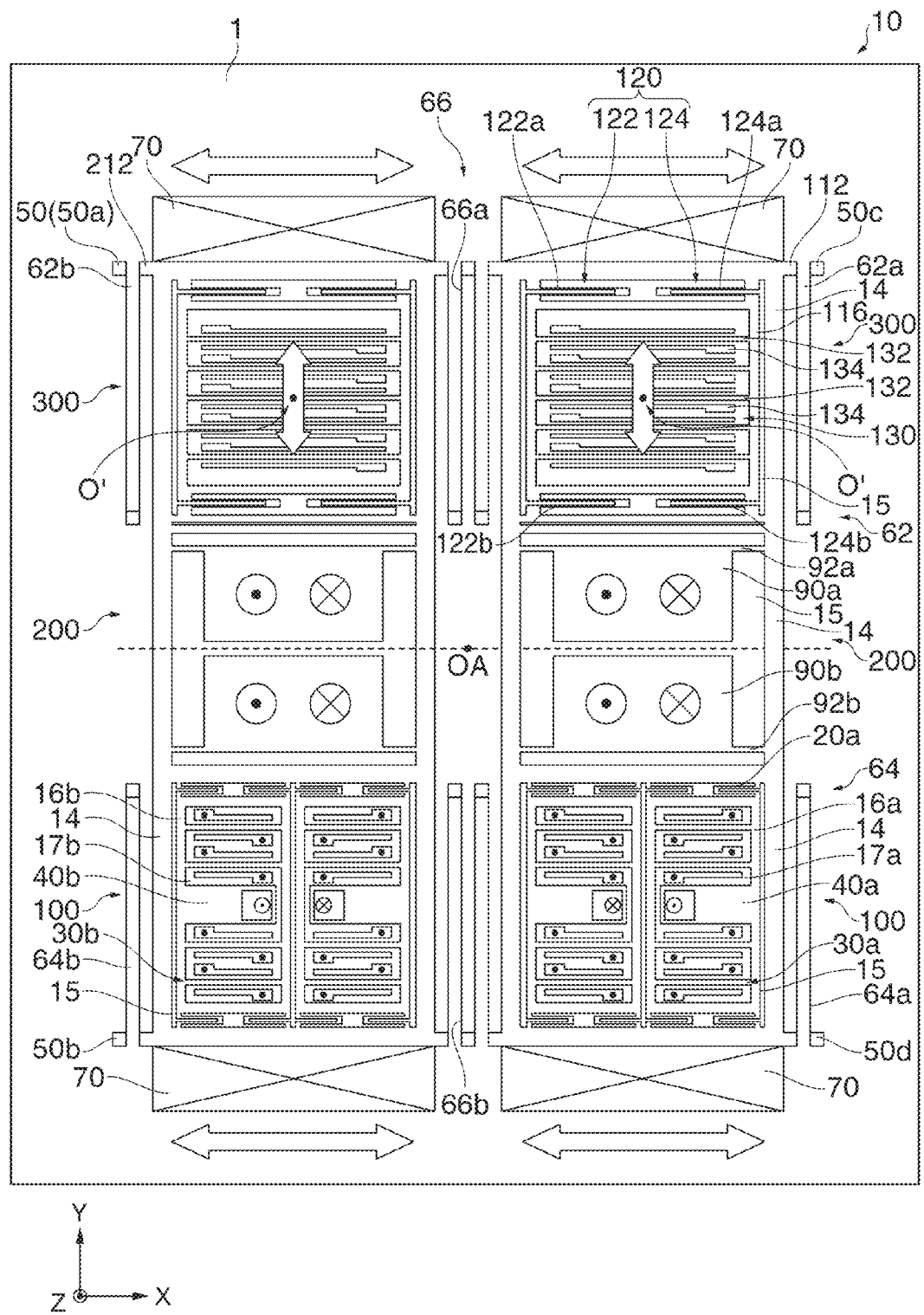
FIG. 1 is a view that shows an outline of a gyro sensor according to an embodiment.

First, a configuration of the gyro sensor according to the embodiment will be described referring to the drawings. FIG. 1 is a view that shows an outline of a configuration of a gyro sensor 10 according to the embodiment. In addition, in FIG. 1 and each drawing shown below, as three axes perpendicular to one another, an X axis, a Y axis and a Z axis are shown. Furthermore, in the embodiment, a direction parallel to the X axis (a first axis) is referred to as an X axis direction, a direction parallel to the Y axis (a second axis) is referred to as a Y axis direction, and a direction parallel to the Z axis (a third axis) is referred to as a Z axis direction.

As shown in FIG. 1, the gyro sensor 10 includes a sensor element 100 capable of detecting the angular velocity around the X axis, a sensor element 200 capable of detecting the angular velocity around the Y axis, and a sensor element 300 capable of detecting the angular velocity around the Z axis. In addition, the gyro sensor 10 may include at least the sensor element 100. For example, the gyros sensor 10 may have the sensor element 100 and any one of the sensor elements 200 and 300.

Figure 2:
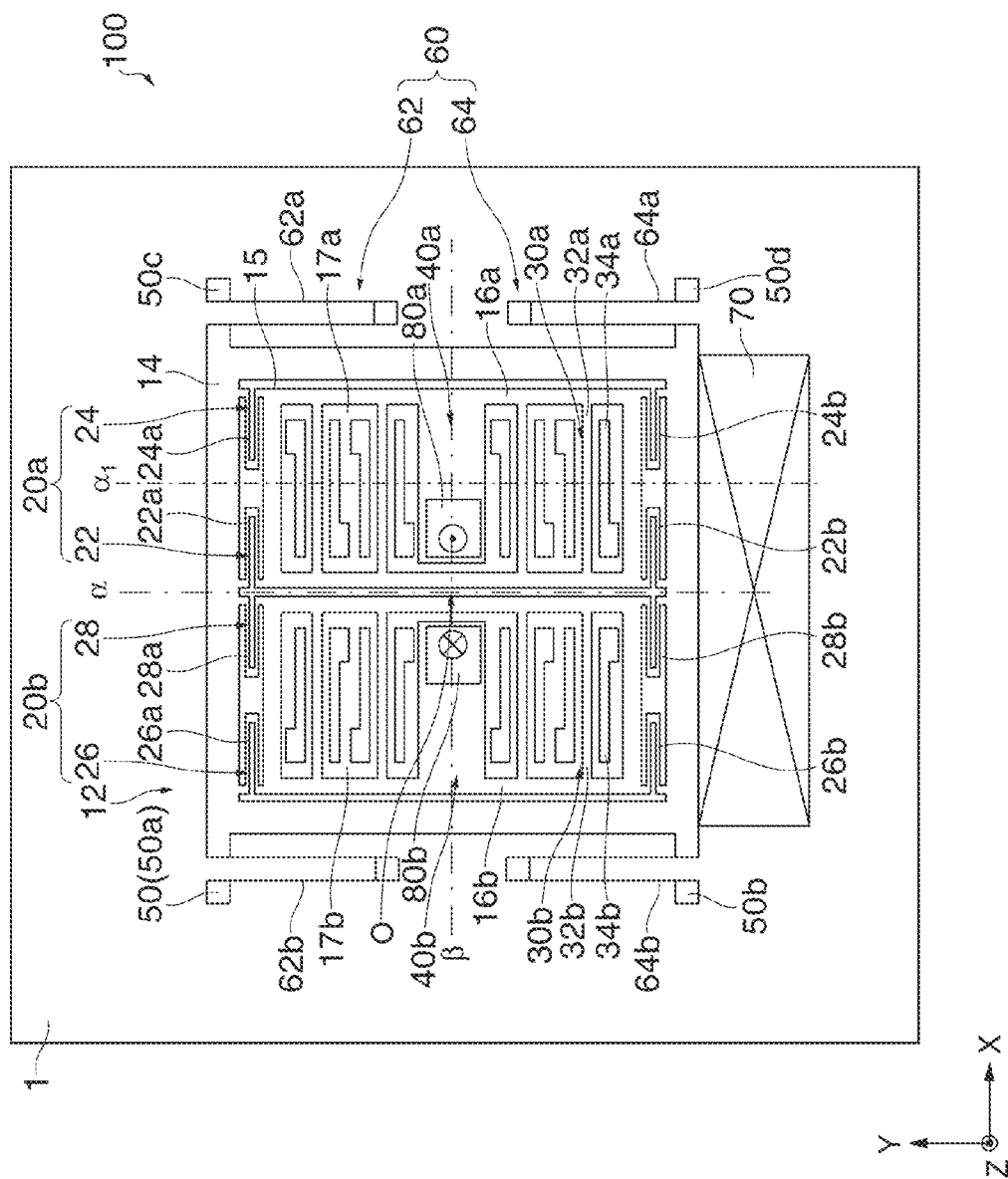
FIG. 2 is a view that shows an outline of a configuration of a sensor element of the gyro sensor according to the embodiment.

FIG. 2 is a view that shows an outline of the configuration of the sensor element 100. As shown in FIG. 2, the sensor element 100 includes a structure 12 that includes a drive mass unit 14, detection mass units 16a and 16b, elastic portions 20a and 20b, detection units 30a and 30b, vibrating bodies 40a and 40b, a drive elastic portion 60, and a drive unit 70.

The structure 12 is mainly formed of silicon, and by processing a silicon substrate (a substrate made of silicon) to a desired external shape using a thin film forming technique (for example, volume techniques such as an epitaxial growth technique and a chemical vapor phase epitaxy technique) and various processing techniques (for example, etching techniques such as dry etching and wet etching), the above-mentioned respective units 14, 16a, 16b, 20a, 20b, 30a, 30b, 40a, 40b, 60 and 70 are integrally formed. Otherwise, after bonding the silicon substrate and the glass substrate (the substrate 1) together, by processing only the silicon substrate to a desired external shape, the above-mentioned respective units 14, 16a, 16b, 20a, 20b, 30a, 30b, 40a, 40b, 60 and 70 can be formed. By forming the structure 12 mainly by silicon, excellent vibration characteristics can be realized, and excellent durability can be exhibited. Furthermore, it is possible to apply a minute processing technique used for manufacturing a silicon semiconductor device, and the miniaturization of the gyro sensor 10 can be promoted.

The drive mass unit 14 vibrates in the X axis direction (along the X axis) by the drive unit 70. The drive mass unit 14 is provided on the substrate 1 at a predetermined distance. The drive mass unit 14 is provided over the substrate 1 via an interval. The drive mass unit 14 has a first cavity portion 15. For example, the drive mass unit 14 is a rectangular frame body when viewed in plane (when viewed from the Z axis direction). In addition, in the shown example, although the drive mass unit 14 has a frame shape, shapes other than the frame shape can also be applied. A side surface (a side surface having a perpendicular line parallel to the X axis) of the drive mass unit 14 in the X axis direction is connected to the drive elastic portion 60.

The drive elastic portion 60 connects the drive mass unit 14 to the fixing unit 50 (50a, 50b, 50c and 50d) fixed to the substrate 1. For example, the drive elastic portion 60 has two sets of spring pairs 62 and 64. One spring pair 62 of the two sets of spring pairs 62 and 64 has springs 62a and 62b. The spring 62a extends in the −X axis direction, while reciprocating in the Y axis direction from the fixing unit 50c to the drive mass unit 14. Furthermore, the spring 62b extends in the +X axis direction, while reciprocating in the Y axis direction from the fixing unit 50a to the drive mass unit 14. The spring 62a and the spring 62b are provided symmetrically with respect to an axis α parallel to the Y axis through a center O of the drive mass unit 14 when viewed from a plane. For that reason, the deformation of the spring pair 62 in the Y axis direction and the Z axis direction is suppressed, and the spring pair 62 can smoothly expand and contract in the X axis direction serving as the drive direction.

Furthermore, the other spring pair 64 of the two sets of spring pairs has springs 64a and 64b. The spring 64a extends in the −X axis direction while reciprocating in the Y axis direction from the fixing unit 50d to the drive mass unit 14. Furthermore, the spring 64b extends in the +X axis direction while reciprocating in the Y axis direction from the fixing unit 50b to the drive mass unit 14. The spring 64a and the spring 64b are provided symmetrically with respect to an axis α parallel to the Y axis through a center O of the drive mass unit 14 when viewed from a plane. Furthermore, the two sets of spring pairs 62 and 64 are provided symmetrically with respect to an axis β parallel to the X axis through the center O of the drive mass unit 14. Thereby, the deformation of the drive elastic portion 60 in the Y axis direction and the Z axis direction is suppressed, and the spring pair 62 can smoothly expand and contract in the X axis direction serving as the drive direction.

The first detection mass unit 16a is connected to the drive mass unit 14 via the first elastic portion 20a. The second detection mass unit 16b is connected to the drive mass unit 14 via the second elastic portion 20b. The first detection mass unit 16a and the second detection mass unit 16b are provided within the first cavity portion 15 of the drive mass unit 14. In the shown example, the first cavity portion 15 of the drive mass unit 14 is partitioned into two regions by the axis α parallel to the Y axis through the center O of the drive mass unit 14 (the first cavity portion 15) when viewed along a plane. The first detection mass unit 16a is provided in a region of the +X axis direction side of the two regions partitioned by the axis α, and the second detection mass unit 16b is provided in the region of the −X axis direction side. For example, the detection mass units 16a and 16b are rectangular frame bodies when viewed in a plane. In addition, the detection mass units 16a and 16b can also apply the shapes other than the frame shape. The first detection mass unit 16a and the second detection mass unit 16b are provided symmetrically with respect to the axis α when viewed in a plane.

The first detection mass unit 16a has a second cavity portion 17a. The first vibrating body 40a and the first detection unit 30a are provided in the second cavity portion 17a of the first detection mass unit 16a. The second detection mass unit 16b has a third cavity portion 17b. The second vibrating body 40b and the second detection unit 30b are provided in the third cavity portion 17b of the second detection mass unit 16b.

The first elastic portion 20a connects the drive mass unit 14 with the first detection mass unit 16a and can be displaced in the Y axis direction perpendicular to the drive direction (the X axis direction). The first elastic portion 20a has, for example, two sets of spring pairs 22 and 24. One spring pair 22 of the two sets of spring pairs has springs 22a and 22b. The spring 22a extends in the −Y axis direction, while reciprocating in the X axis direction from the drive mass unit 14 to the first detection mass unit 16a. The spring 22b extends in the +Y axis direction, while reciprocating in the X axis direction from the drive mass unit 14 to the first detection mass unit 16a. The spring 22a and the spring 22b are provided symmetrically with respect to the axis β parallel to the X axis through the center of the first detection mass unit 16a when viewed in a plane. For that reason, the deformation of the spring pair 22 in the X axis direction and the Z axis direction is suppressed, and the spring pair 22 can smoothly expand and contract in the Y axis direction.

Furthermore, one spring pair 24 of the two sets of spring pairs has springs 24a and 24b. The spring 24a extends in the −Y axis direction while reciprocating in the X axis direction from the drive mass unit 14 to the first detection mass unit 16a. Furthermore, the spring 24b extends in the +Y axis direction while reciprocating in the X axis direction from the drive mass unit 14 to the first detection mass unit 16a. The spring pair 24 is provided symmetrically with respect to an axis β parallel to the X axis through the center of the first detection mass unit 16a when viewed from a plane. Furthermore, the two sets of spring pairs 22 and 24 are provided symmetrically with respect to an axis $α_1$ parallel to the Y axis through the center of the first detection mass unit 16a. Thereby, the deformation of the first elastic portion 20a in the X axis direction and the Z axis direction is suppressed, and the first elastic portion 20a can smoothly expand and contract in the Y axis direction.

The second elastic portion 20b connects the drive mass unit 14 with the second detection mass unit 16b and can be displaced in the Y axis direction. The second elastic portion 20b has, for example, two sets of spring pairs 26 and 28. One spring pair 26 of the two sets of spring pairs has springs 26a and 26b. Furthermore, the other spring pair 28 of the two sets of spring pair has springs 28a and 28b. The two sets of spring pairs 26 and 28 of the second elastic portion 20b are configured similarly with the spring pairs 22 and 24 of the first elastic portion 20a. For that reason, the deformation of the second elastic portion 20b in the X axis direction and the Z axis direction is suppressed, and the second elastic portion 20b can smoothly expand and contract in the Y axis direction.

The drive unit 70 includes a function of vibrating the drive mass unit 14 in the X axis direction (along the X axis) at a predetermined frequency. The drive unit 70 vibrates the drive mass unit 14 in the X axis direction integrally with the detection mass units 16a and 16b. For example, the drive unit 70 is provided on the side surface (a side surface having a perpendicular line parallel to the Y axis) in the Y axis direction of the drive mass unit 14. For example, the drive unit 70 includes a drive electrode and a fixed electrode (not shown), and is driven by electrostatic force between the drive electrode and the fixed electrode. For example, the fixed electrode has a pair of pectinate electrode pieces oppositely placed in the X axis direction via the drive electrode. The drive unit 70 generates electrostatic force between the drive electrode and the electrode piece, by applying the voltage to the electrode piece by a power source (not shown), and vibrates the drive mass unit 14 in the X axis direction at a predetermined frequency, while expanding and contracting the drive elastic portion 60. In addition, for example, the drive unit 70 is not limited to the above-mentioned electrostatic drive type, and for example, can apply a piezoelectric drive type, an electromagnetic drive type using Lorentz force of the magnetic field or the like.

The first detection unit 30a is provided in the first detection mass unit 16a. In the shown example, the first detection unit 30a is provided in the second cavity portion 17a of the first detection mass unit 16a. The first detection unit 30a is able to detect the angular velocity around the axis of the X axis. The first detection unit 30a has a movable electrode 32a. The movable electrode 32a is provided in the first detection mass unit 16a. In the shown example, the movable electrode 32a extends along the X axis, and both ends thereof are connected to the first detection mass unit 16a. The movable electrode 32a is displaced along with the displacement of the first detection mass unit 16a. A plurality of movable electrodes 32a is provided in the first detection mass unit 16a, and the movable electrodes 32a adjacent to each other are provided at a predetermined interval.

A plurality of fixed electrodes 34a is provided in the second cavity portion 17a. The fixed electrodes 34a are provided in the interval between the movable electrodes 32a adjacent to each other. The fixed electrodes 34a extend along the X axis. The fixed electrodes 34a are fixed to an anchor of the substrate 1. In the shown example, two fixed electrodes 34a are provided with respect to one movable electrode 32a. One of the two fixed electrodes 34a faces the side surface in the +Y axis direction of the movable electrode 32a, and the other of the two fixed electrodes 34a faces the side surface in the −Y axis direction of the movable electrode 32a. When the first detection mass unit 16a is displaced in the Y axis direction, the movable electrode 32a approaches or is separated from the fixed electrode 34a, whereby the electrostatic capacity changes. An amount of displacement of the first detection mass unit 16a in the Y axis direction can be obtained from the change of the electrostatic capacity.

The second detection unit 30b is provided in the second detection mass unit 16b. In the shown example, the second detection unit 30b is provided in the third cavity portion 17b of the second detection mass unit 16b. The second detection unit 30b is able to detect the angular velocity around the axis of the X axis. The second detection unit 30b has a movable electrode 32b. The movable electrode 32b is provided in the second detection mass unit 16b. In the shown example, the movable electrode 32b extends along the X axis, and both ends thereof are connected to the second detection mass unit 16b. The movable electrode 32b moves along with the displacement of the second detection mass unit 16b. A plurality of movable electrodes 32a is provided in the second detection mass unit 16b, and the movable electrodes 32b adjacent to each other are provided at a predetermined interval.

A plurality of fixed electrodes 34b is provided in the third cavity portion 17b. The fixed electrodes 34b are provided in the interval between the movable electrodes 32b adjacent to each other. The fixed electrodes 34b extend along the X axis. The fixed electrodes 34b are fixed to an anchor of the substrate 1. In the shown example, two fixed electrodes 34b are provided with respect to one movable electrode 32b. One of the two fixed electrodes 34b faces the side surface in the +Y axis direction of the movable electrode 32b, and the other of the two fixed electrodes 34b faces the side surface in the −Y axis direction of the movable electrode 32b. When the second detection mass unit 16b is displaced in the Y axis direction, the movable electrode 32b approaches or is separated from the fixed electrode 34b, whereby the electrostatic capacity changes. An amount of displacement of the second detection mass unit 16b in the Y axis direction can be obtained from the change of the electrostatic capacity.

The first vibrating body 40a is provided in the first detection mass unit 16a. In the shown example, the first vibrating body 40a is provided in the second cavity portion 17a of the first detection mass unit 16a. The first vibrating body 40a extends in the −X axis direction, and one end thereof is connected to the first detection mass unit 16a. The first vibrating body 40a is a cantilever support structure (a cantilever structure) in which one end (an end portion of the +X axis direction side) is connected to the first detection mass unit 16a as a fixed end and extends in the −X axis direction, and the other end (an end portion of the −X axis direction side) is a free end. The first vibrating body 40a vibrates in the X axis direction along with the vibration of the first detection mass unit 16a in the X axis direction. In the shown example, since the free end of the first vibrating body 40a extends in the X axis direction serving as the drive direction, when vibrating in the X axis direction, the free end thereof vibrates in the Z axis direction. When viewed in a plane, the first vibrating body 40a is provided on the axis β.

The second vibrating body 40b is provided in the second detection mass unit 16b. In the shown example, the second vibrating body 40b is provided in the third cavity portion 17b of the second detection mass unit 16b. The second vibrating body 40b extends in the X axis direction, and one end thereof is connected to the second detection mass unit 16b. The second vibrating body 40b is a cantilever support structure (a cantilever structure) in which one end (an end portion of the −X axis direction side) is connected to the second detection mass unit 16b as a fixed end and extends in the +X axis direction, and the other end (an end portion of the +X axis direction side) is a free end. That is, the extension direction of the first vibrating body 40a is opposite to the extension direction of the second vibrating body 40b. The second vibrating body 40b vibrates in the X axis direction along with the vibration of the second detection mass unit 16b in the X axis direction. The second vibrating body 40b can vibrate in the Z axis direction by the vibration in the X axis direction. Specifically, since the free end of the second vibrating body 40*b* extends in the X axis direction serving as the drive direction, when vibrating in the X axis direction, the free end thereof vibrates in the Z axis direction. When viewed in a plane, the second vibrating body 40*b* is provided on the axis β.

Since the extension direction (−X axis direction) of the first vibrating body 40*a* is opposite to the extension direction (+X axis direction) of the second vibrating body 40*b*, the first vibrating body 40*a* and the second vibrating body 40*b* vibrate at phases opposite to each other. For example, the vibration of the first vibrating body 40*a* and the vibration of the second vibrating body 40*b* have the same period (frequency), and the phase of the vibration of the first vibrating body 40*a* and the phase of the vibration of the second vibrating body 40*b* deviate from each other by 180°. The structures of the vibrating bodies 40*a* and 40*b* are structures supported by the first detection mass units 16*a* and 16*b* in a cantilever manner, and if any structure has a shape capable of vibrating in the Z axis direction along the drive vibration due to the drive unit, the shape is not particularly limited. The shapes of the vibrating units 40*a* and 40*b* are flat plate shapes in the shown example.

The gyro sensor of the embodiment of the invention unifies the drive unit adapted to vibrate the vibrating bodies to promote the miniaturization of the whole sensor. In order to detect the angular velocity at the fixed vibration frequency, it is desirable to vibrate the vibrating bodies 40*a* and 40*b* at the same frequency as the driving resonance frequency of the drive vibration due to the drive unit. Although the vibrating bodies 40*a* and 40*b* are designed in a shape that oscillates at the same frequency as the driving resonance frequency in advance, in some cases, it is difficult to form the vibrating bodies at the same frequency due to errors or the like in the production.

Thus, on an upper surface of the first vibrating body 40*a*, a first frequency adjustment unit 80*a* capable of adjusting the resonance frequency is provided. Furthermore, on an upper surface of the second vibrating body 40*b*, a second frequency adjustment unit 80*b* capable of adjusting the resonance frequency is provided.

The frequency adjustment units 80*a* and 80*b* are formed by applying a metallic film such as gold and tungsten onto the upper surfaces of the vibrating bodies 40*a* and 40*b*. Moreover, the frequency adjustment units 80*a* and 80*b* are irradiated with laser beam, at least a part of the metallic film is peeled off, and the resonance frequency of the vibrating bodies 40*a* and 40*b* can be adjusted. The frequency adjustment units 80*a* and 80*b* may directly irradiate the vibrating bodies 40*a* and 40*b* with laser beam, in addition to the metallic film, may reduce the mass of the vibrating bodies 40*a* and 40*b*, and may perform the adjustment of the resonance frequency. It is possible to match the resonance frequency of the vibrating bodies 40*a* and 40*b* with the resonance frequency of the drive vibration of the drive mass unit 14 due to the drive unit 70, using the frequency adjustment units 80*a* and 80*b*.

The sensor element 200 is an element capable of detecting the angular velocity around the Y axis. As shown in FIG. 1, the sensor element 200 has a pair of displacement plates 90*a* and 90*b* in the first cavity portion 15 of the drive mass unit 14. The displacement plates 90*a* and 90*b* are connected to the side surface (the side surface having a perpendicular line parallel to the X axis) in the X axis direction of the drive mass unit 14, by beam portions 92*a* and 92*b* serving as the rotation axis. The displacement plates 90*a* and 90*b* can serve as the detection units for detecting the angular velocity around the Y axis. The beam portions 92*a* and 92*b* are provided at the positions deviated from the centers of each of the displacement plates 90*a* and 90*b*. The beam portions 92*a* and 92*b* are provided along the X axis direction. The beam portions 92*a* and 92*b* can be torsionally deformed, and displace the displacement plates 90*a* and 90*b* in the Z axis direction by the torsional deformation. The displacement plate 90*a* extend in the −Y axis direction from the beam portion 92*a*, and the displacement plate 90*b* extend in the +Y axis direction from the beam portion 92*b*. That is, the extension direction of the displacement plate 90*a* is opposite to the extension direction of the displacement plate 90*b* each other. For that reason, the displacement plates 90*a* and 90*b* rotate in the directions opposite to each other (one thereof rotates in the right direction, and the other thereof rotates in the left direction) by the angular velocity around the Y axis, and are displaced in the Z axis direction. At the locations facing the displacement plates 90*a* and 90*b*, a fixed electrode (not shown) is provided at an interval. When the displacement plates 90*a* and 90*b* are displaced in the Z axis direction, the displacement plates 90*a* and 90*b* approach and are separated from the fixed electrode, whereby the electrostatic capacity changes. An amount of displacement of the displacement plates 90*a* and 90*b* in the Z axis direction can be obtained by detecting the change of the electrostatic capacity. The angular velocity around the Y axis can be detected from the amount of displacement of the displacement plates 90*a* and 90*b* in the Z axis direction.

The sensor element 300 is a detection element capable of detecting the angular velocity around the Z axis. As shown in FIG. 1, the sensor element 300 has a detection mass unit 116, an elastic portion 120, and a detection unit 130.

The detection mass unit 116 is provided in the first cavity portion 15 of the drive mass unit 14. In the shown example, the detection mass unit 116 is surrounded by the drive mass unit 14. The detection mass unit 116 is a rectangular frame body when viewed in a plane. The detection mass unit 116 is connected to the drive mass unit 14 via the elastic portion 120.

The elastic portion 120 is connected to the drive mass unit 14 and the detection mass unit 116 and can be displaced in the Y axis direction. The elastic portion 120 has two sets of spring pairs 122 and 124. One spring pair 122 of the two sets of spring pairs has springs 122*a* and 122*b*. The springs 122*a* and 122*b* extend in the Y axis direction, while reciprocating in the X axis direction. The springs 122*a* and 122*b* are provided symmetrically with respect to an axis parallel to the X axis through a center O' of the detection mass unit 116 when viewed in a plane. For that reason, the deformation of the spring pair 122 in the X axis direction and the Z axis direction is suppressed, and the spring pair 122 can smoothly expand and contract in the Y axis direction.

Furthermore, the other spring pair 124 of the two sets of spring pairs has springs 124*a* and 124*b*. The springs 124*a* and 124*b* extend in the Y axis direction while reciprocating in the X axis direction. The springs 124*a* and 124*b* are provided symmetrically in an axis parallel to the X axis through the center O' of the detection mass unit 116 when viewed from a plane. Furthermore, the two sets of spring pairs 122 and 124 are provided symmetrically with respect to an axis parallel to the Y axis through the center O' of the detection mass unit 116. Thereby, the deformation of the elastic portion 120 in the X axis direction and the Z axis direction is suppressed, and the elastic portion 120 can smoothly expand and contract in the Y axis direction.

The detection unit 130 has a movable electrode 132. The detection unit 130 is able to detect the angular velocity around the Z axis. The movable electrode 132 is connected to the detection mass unit 116. In the show example, the movable electrode 132 extends along the X axis and both ends thereof are connected to the detection mass unit 116. A plurality of movable electrodes 132 is provided, and the movable electrodes 132 adjacent to each other are provided at a predetermined interval. The fixed electrode 134 is provided in the interval between the movable electrodes 132 adjacent to each other. The fixed electrode 134 extends along the X axis. The fixed electrode 134 is fixed to the anchor of the substrate 1. When the detection mass unit 116 is displaced in the Y axis direction, the movable electrode 132 approaches or is separated from the fixed electrode 134, whereby the electrostatic capacity changes. The amount of displacement of the detection mass unit 116 in the Y axis direction can be obtained from the change of the electrostatic capacity. The angular velocity around the Z axis can be detected from the amount of displacement of the detection mass unit 116 in the Y axis direction.

The gyro sensor 10 has two structures (a first structure 112 and a second structure 212) placed along the drive direction (the X axis direction). The first structure 112 and the second structure 212 each have the sensor elements 100, 200 and 300. In addition, the first structure 112 and the second structure 212 may have a configuration that has at least the sensor element 100 and further include at least one of the sensor elements 200 and 300.

The first structure 112 and the second structure 212 are mainly formed of silicon, and by processing a silicon substrate to a desired external shape using a thin film forming technique and various processing techniques, the respective units forming the sensor elements 100, 200 and 300 are integrally formed.

The first structure 112 and the second structure 212 are connected to each other by the connecting elastic portion 66. For example, the connecting elastic portion 66 includes a set of spring pair having the springs 66a and 66b. The spring 66a extends in the –X axis direction, while reciprocating in the Y axis direction from the first structure 112 to the second structure 212. The spring 66b extends in the –X axis direction, while reciprocating in the Y axis direction from the first structure 112 to the second structure 212. The springs 66a and 66b are provided symmetrically with respect to the axis parallel to the X axis through a center OA of the first structure 112 and the second structure 212, when viewed in a plane. Thereby, the deformation of the connecting elastic portion 66 in the Y axis direction and the Z axis direction is suppressed, and the connecting elastic portion 66 smoothly expands and contracts in the X axis direction serving as the drive direction. The drive elastic portions 60 are provided in four corners of the first structure 112 and the second structure 212 connected to each other.

The drive units 70 of the gyro sensor 10 are each provided on two side surfaces of the first structure 112 in the Y axis direction. Furthermore, the drive units 70 are each provided on two side surfaces of the second structure 212 in the Y axis direction. In the drive unit 70 of the first structure 112, for example, the alternating voltage with the phase shifted by 180° is applied to a pair of electrode pieces of the fixed electrode. Furthermore, in the drive unit 70 of the second structure 212, for example, the alternating voltage with the phase shifted by 180° is applied to a pair of electrode pieces of the fixed electrode. The drive mass unit 14 of the first structure 112 and the drive mass unit 14 of the second structure 212 are driven (vibrated) in the X axis direction at the phases opposite to each other and at the same frequency (tuning fork vibration). Thus, the Q value can be increased. In addition, if the drive mass unit 14 of the first structure 112 and the drive mass unit 14 of the second structure 212 can be driven at the phases opposite to each other and at the same frequency, the number and the configuration of the drive unit 70 are not particularly limited.

2. Operation of Gyro Sensor

Figure 3A:
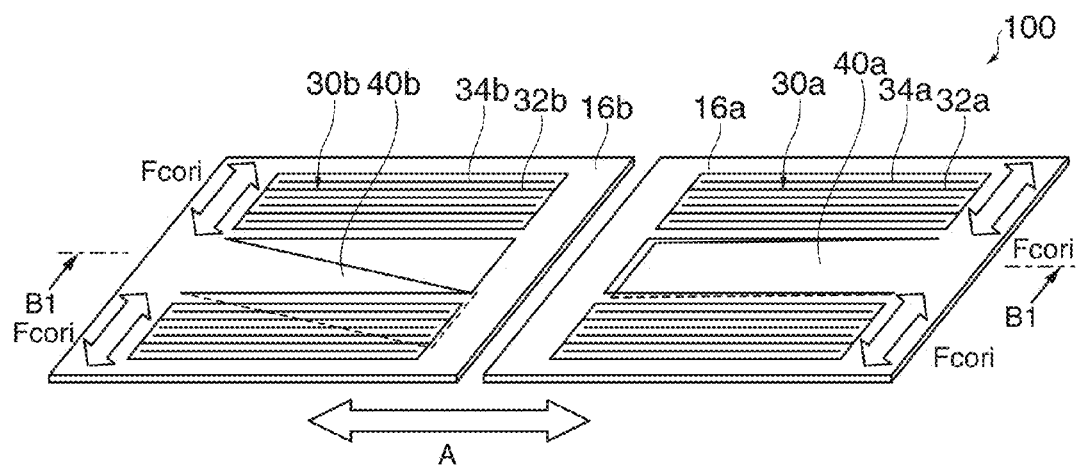
FIGS. 3A and 3B are views that schematically show the sensor element of the gyro sensor according to the embodiment.
Figure 3B:
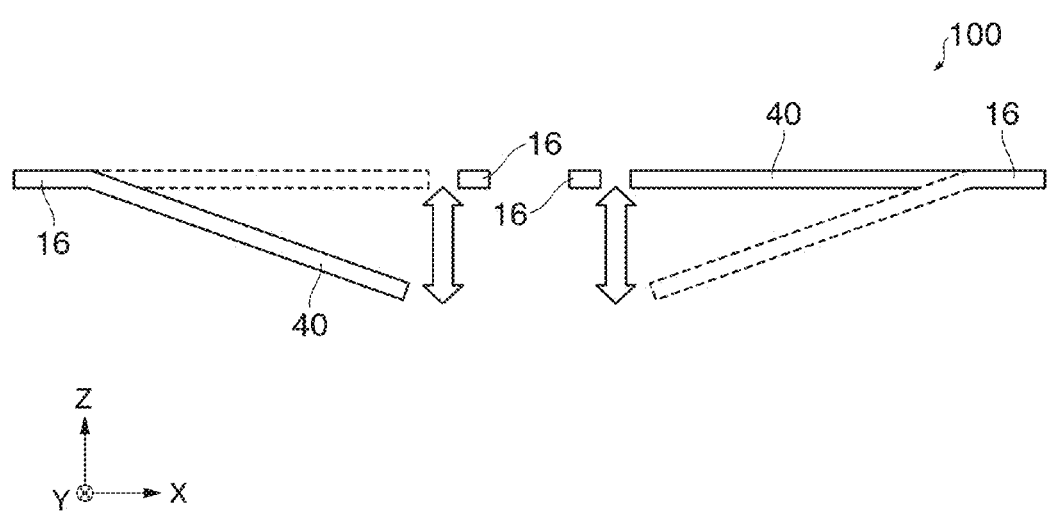

Next, the operation of the gyro sensor 10 will be described. First, the operation of the gyro sensor 100 will be described. FIG. 3A is a perspective view that schematically shows the sensor element 100, and FIG. 3B is a cross-sectional view taken from line B1-B1 of FIG. 3A. In addition, FIGS. 3A and 3B simply show the gyro sensor 10.

The detection mass units 16a and 16b vibrate in the drive direction (the X axis direction) A by the drive unit. The vibrating bodies 40a and 40b vibrate in the Z axis direction by the drive vibration. Since the extension direction of the first vibrating body 40a is opposite to that of the second vibrating body 40b, the first vibrating body 40a and the second vibrating body 40b vibrate at the phases opposite to each other. Specifically, for example, first, the first vibrating body 40a is displaced in the +Z axis direction, and the second vibrating body 40b is displaced in the –Z axis direction. Next, the first vibrating body 40a is displaced in the –Z axis direction, and the second vibrating body 40b is displaced in the +Z axis direction. The first vibrating body 40a and the second vibrating body 40b repeat this operation. In this manner, the first vibrating body 40a and the second vibrating body 40b vibrate at the phases opposite to each other.

In the state where the vibrating bodies 40a and 40b vibrate, when the angular velocity $\Omega x$ is applied around the same X axis as the drive direction A, Coriolis' force acts, and the movable electrode 32a and the movable electrode 32b are displaced in the opposite directions each other along the Y axis. Specifically, for example, the movable electrode 32a is displaced in the +Y axis direction, and the movable electrode 32b is displaced in the –Y axis direction. Next, the movable electrode 32a is displaced in the –Y axis direction, and the movable electrode 32b is displaced in the +Y axis direction. The movable electrode 32a and the movable electrode 32b repeat this operation, while receiving the Coriolis' force.

The movable electrodes 32a and 32b are displaced along the Y axis, whereby the electrostatic capacity between the movable electrodes 32a and 32b and the fixed electrodes 34a and 34b changes. In the sensor element 100, by applying the voltage to the movable electrodes 32a and 32b and the fixed electrodes 34a and 34b, the amount of change of the electrostatic capacity between the movable electrodes 32a and 32b and the fixed electrodes 34a and 34b is detected, and the angular velocity $\Omega x$ around the X axis can be detected.

Herein, in the sensor element 100, when detecting the angular velocity around the X axis, in some cases, the angular velocity around the Z axis may be also detected. In addition, in some cases, when detecting the angular velocity around the axis of the X axis, the angular velocity around the Y axis direction is also detected. In the gyro sensor 10, the extension direction (–X axis direction) of the first vibrating body 40a is opposite to the extension direction (+X axis direction) of the second vibrating body 40b each other. For that reason, the first detection mass unit 16a and the second detection mass unit 16b are displaced in the directions opposite to each other by the angular velocity around the X axis. Furthermore, the first detection mass unit 16a and the second detection mass unit 16b are displaced in the same direction by the angular velocity around the axis of the Z axis and the acceleration in the Y axis direction. Thereby, the errors generated by the angular velocity around the axis of the Z axis or the acceleration in the Y axis direction can be cancelled by the signal processing, and thus the detection accuracy of the angular velocity around the axis of the X axis can be increased. In addition, the signal processing method of the gyro sensor 10 will be described later.

Figure 4A:
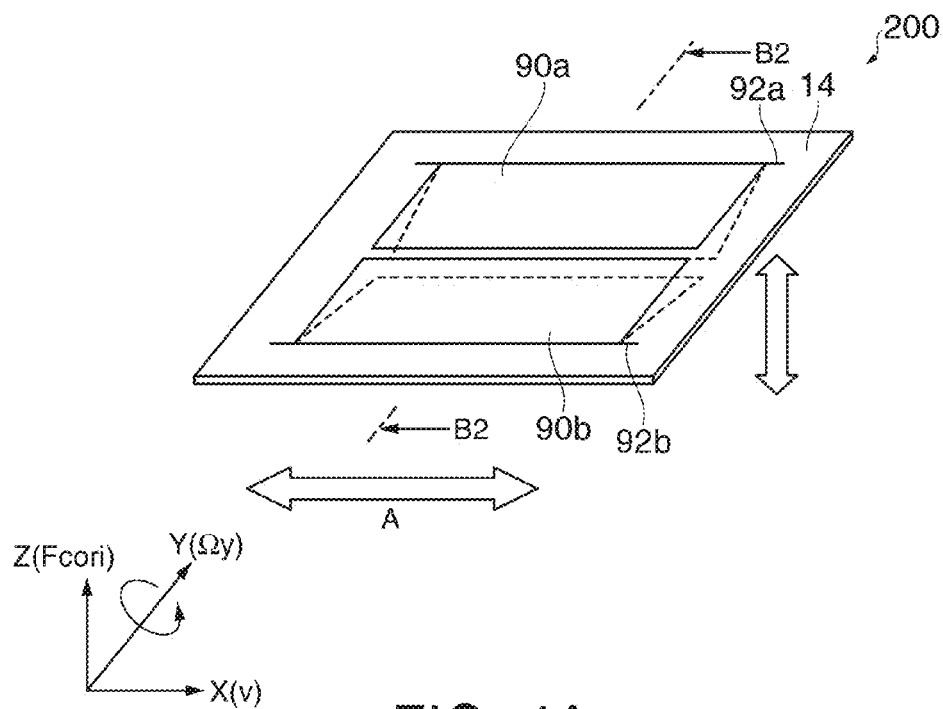
FIGS. 4A and 4B are views that schematically show the sensor element of the gyro sensor according to the embodiment.
Figure 4B:
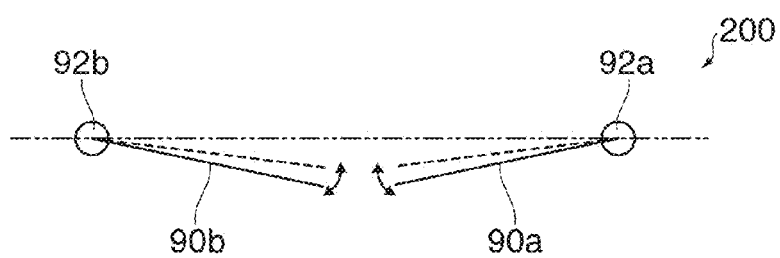

Next, the operation of the sensor element 200 will be described. FIG. 4A is a perspective view that schematically shows the sensor element 200, and FIG. 4B is a cross-sectional view taken from line B2-B2 of FIG. 4A. In addition, FIGS. 4A and 4B simply show the sensor element 200.

The drive mass unit 14 vibrates in the drive direction (the X axis direction) A by the drive unit. The displacement plates 90a and 90b vibrate in the X axis direction by the drive vibration. When the angular velocity Ωy is applied around the Y axis in the state where the displacement plates 90a and 90b vibrate, Coriolis' force acts, and the displacement plates 90a and 90b are displaced along the Z axis. Thereby, the electrostatic capacity between the displacement plates 90a and 90b and a fixed electrode (not shown) changes. In the sensor element 200, by detecting the amount of change of the electrostatic capacity, the angular velocity Ωy around the Y axis can be detected.

Figure 5:
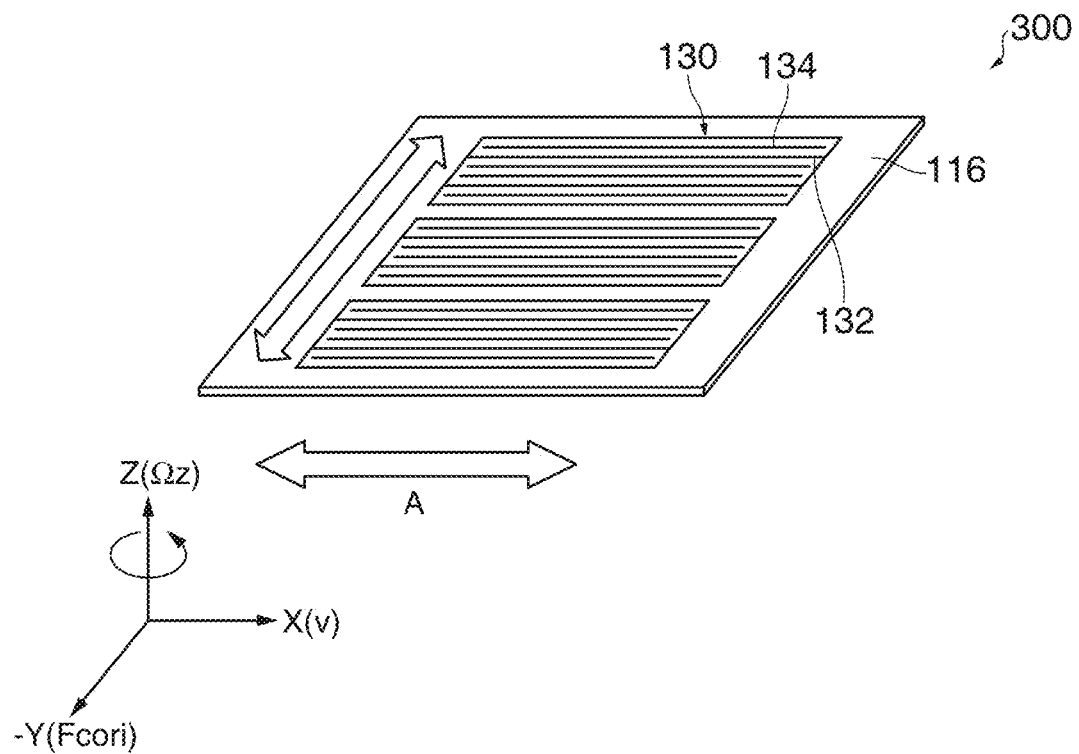
FIG. 5 is a view that schematically shows the sensor element of the gyro sensor according to the embodiment.

Next, the operation of the sensor element 300 will be described. FIG. 5 is a perspective view that schematically shows the sensor element 300. In addition, FIG. 5 simply shows the sensor element 300.

The detection mass unit 116 is driven (vibrated) in the drive direction (the X axis direction) A by the drive unit. When the angular velocity Ωz is applied around the Z axis in the state where the detection mass unit 116 vibrates, Coriolis' force acts, and the movable electrode 132 is displaced along the Y axis. Thereby, the electrostatic capacity between the movable electrode 132 and the fixed electrode 134 changes. In the sensor element 300, by detecting the amount of change of the electrostatic capacity, the angular velocity Ωz around the Z axis can be detected.

3. Integrated Circuit of Gyro Sensor

Figure 6:
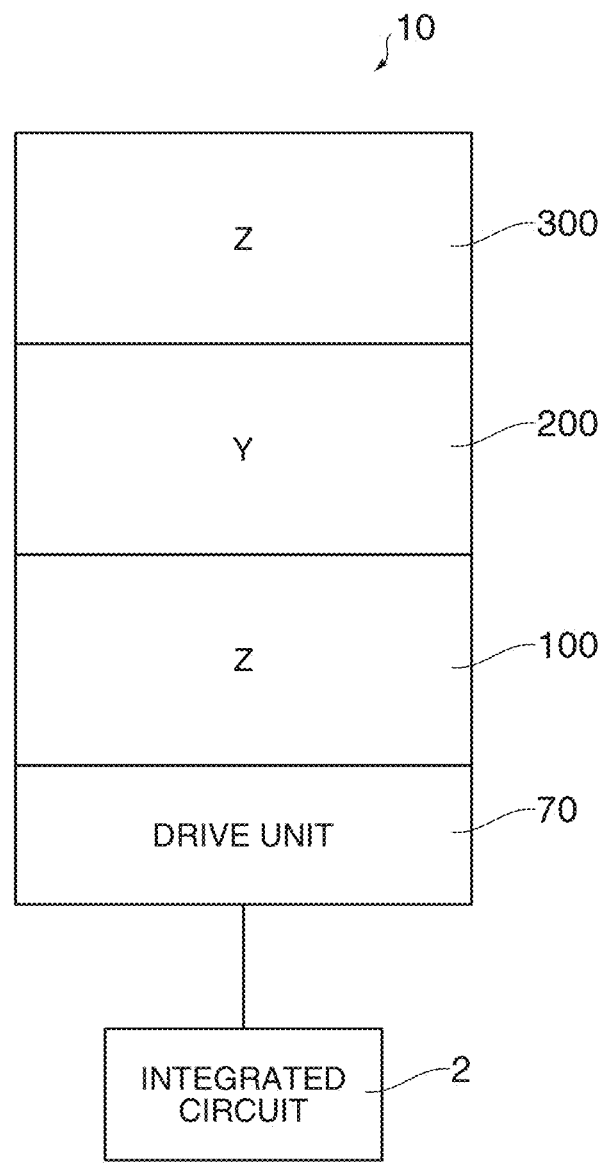
FIG. 6 is a view for describing an integrated circuit of the gyro sensor according to the embodiment.

Next, the integrated circuit of the gyro sensor 10 will be described. FIG. 6 is a view for describing the integrated circuit of the gyro sensor 10. The gyro sensor 10 has IC (Integrated Circuit) 2 having the drive circuit for driving the drive unit 70. The integrated circuit 2 is electrically connected to the drive unit 70. In the gyro sensor 10, the sensor elements 100, 200 and 300 are able to share the drive unit 70 for applying the drive vibration to the sensor elements 100, 200 and 300 so as to use the drive vibration in the same X axis direction. Thereby, since the drive unit can be driven using one drive circuit, for example, compared to a case where the drive circuit is provided for each element, the mounting area can be reduced, and the miniaturization can be promoted. Furthermore, since the sensor elements 100, 200 and 300 are driven in one vibration mode, there is no problem that the vibration modes of each sensor element interfere with each other.

For example, the integrated circuit 2 is electrically connected to each electrode of the sensor elements 100, 200 and 300, and has a signal processing circuit for performing the signal processing of the detection signal detected by each electrode of the respective sensor elements 100, 200 and 300.

4. Signal Processing Method of Gyro Sensor

Figure 7:
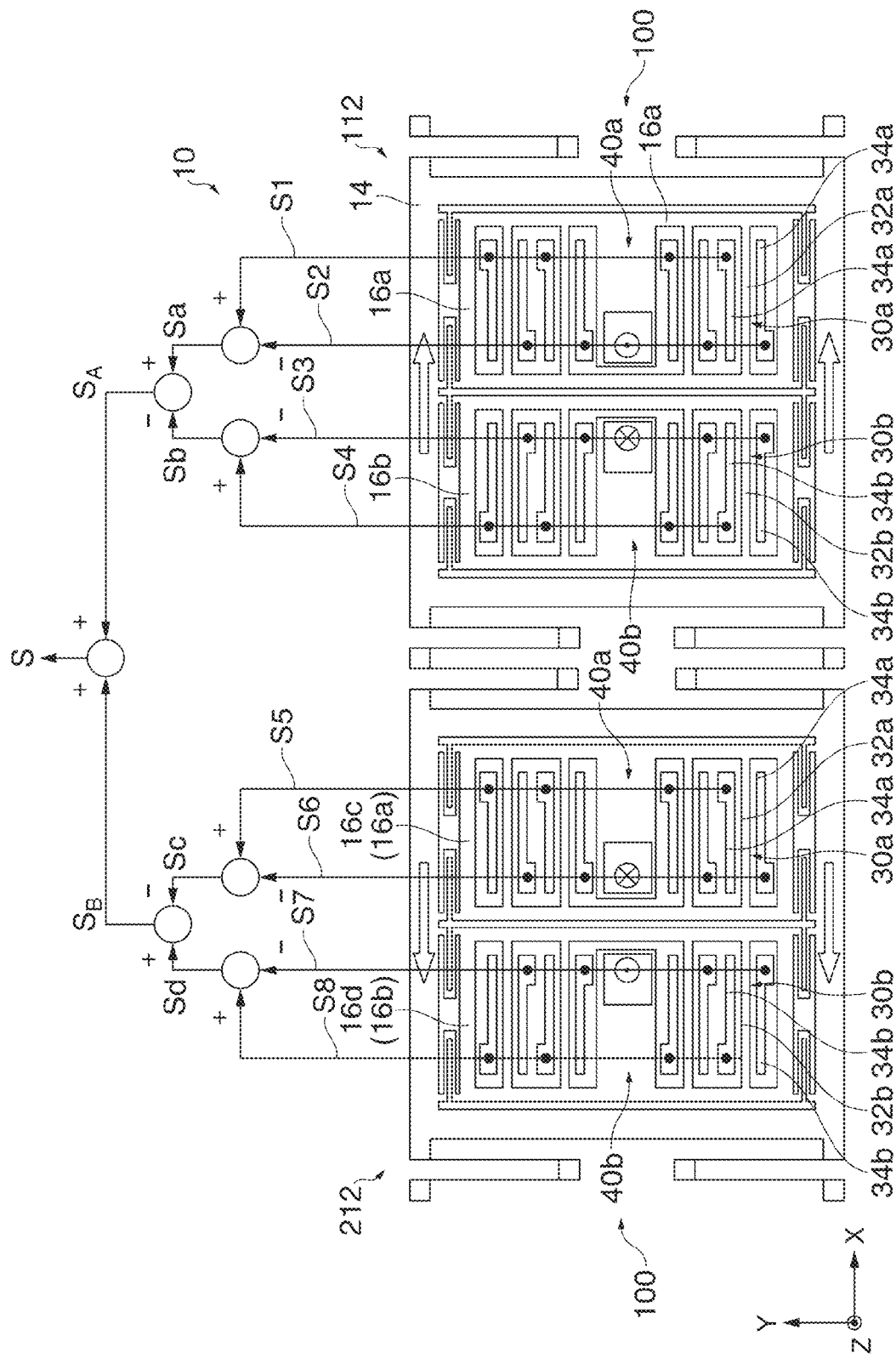
FIG. 7 is a view for describing a signal processing method of the gyro sensor according to the embodiment.

Next, the signal processing method of the gyro sensor 10 will be described. FIG. 7 is a view for describing the signal processing method of the gyro sensor 10.

In FIG. 7, in the first structure 112, the detection signal of the fixed electrode 34a of the +Y axis direction side of the movable electrode 32a is set to S1, and the detection signal of the fixed electrode 34a of the −Y axis direction side of the movable electrode 32a is set to S2. Furthermore, in the first structure 112, the detection signal of the fixed electrode 34b of the −Y axis direction side of the movable electrode 32b is set to S3, and the detection signal of the fixed electrode 34b of the +Y axis direction side of the movable electrode 32b is set to S4. That is, the detection signals S1 and S2 are signals that fluctuate based on the displacement of the movable electrode 32a of the first structure 112. Furthermore, the detection signals S3 and S4 are signals that fluctuate based on the displacement of the movable electrode 32b of the first structure 112.

Furthermore, in the second structure 212, the detection signal of the fixed electrode 34a of the +Y axis direction side of the movable electrode 32a is set to S5, and the detection signal of the fixed electrode 34a of the −Y axis direction side of the movable electrode 32a is set to S6. Furthermore, in the second structure 212, the detection signal of the fixed electrode 34b of the −Y axis direction side of the movable electrode 32b is set to S7, and the detection signal of the fixed electrode 34b of the +Y axis direction side of the movable electrode 32b is set to S8. That is, the detection signals S5 and S6 are signals that fluctuate based on the displacement of the movable electrode 32a of the second structure 212. Furthermore, the detection signals S7 and S8 are signals that fluctuate based on the displacement of the movable electrode 32b of the second structure 212.

In the gyro sensor 10, in the first structure 112, the signal processing is performed in which the output signal (the signal fluctuating based on the displacement of the movable electrode 32a) Sa of the first detection unit 30a is Sa=S1−S2, the output signal (the signal fluctuating based on the displacement of the movable electrode 32b) Sb of the second detection unit 30b is Sb=S4−S3, and the output signal $S_A$ of the sensor element 100 is $S_A$=Sa−Sb. Furthermore, in the second structure 212, the signal processing is performed in which the output signal Sc of the first detection unit 30a is Sc=S5−S6, the output signal Sd of the second detection unit 30b is Sd=S8−S7, and the output signal $S_B$ of the sensor element 100 is $S_B$=Sd−Sc. In addition, the signal processing is performed in which the output signal S of the gyro sensor 10 is S=$S_A$+$S_B$. Thereby, the gyro sensor 10 is able to obtain the detection signal of the angular velocity around the axis of the X axis, in which the errors generated by the angular velocity around the axis of the Z axis or the acceleration in the Y axis direction are cancelled. Thus, it is possible to increase the detection accuracy of the angular velocity around the axis of the X axis. Hereinafter, the configuration will be specifically described.

As shown in FIG. 7, in the state where the drive mass unit 14 of the first structure 112 is displaced in the +X axis direction and the drive mass unit 14 of the second structure 212 is displaced in −X axis direction, when the angular velocity is input around the axis of the X axis, for example, the first detection mass unit 16a of the first structure 112 is displaced in the +Y axis direction, and the second detection mass unit 16b of the first structure 112 is displaced in the −Y axis direction. Furthermore, the first detection mass unit 16c of the second structure 212 is displaced in the −Y axis direction, and the second detection mass unit 16d of the second structure 212 is displaced in the +Y axis direction.

In this state, in the first structure 112, the detection signal S1 is S1=$C_0$+ΔC, and the detection signal S2 is S2=$C_0$−ΔC. Furthermore, the detection signal S3 is S3=$C_0$+ΔC, and the detection single S4 is S4=$C_0$−ΔC. Furthermore, in the second structure 212, the detection signal S5 is S5=$C_0$−ΔC, and the detection signal S6 is S6=$C_0$+ΔC.

Furthermore, the detection signal S7 is S7=$C_0$−ΔC, and the detection signal S8 is S8=$C_0$+ΔC. In addition, the capacity $C_0$ is an initial capacity between the movable electrode 32a and the fixed electrode 34a (or the movable electrode 32b and the fixed electrode 34b). Herein, the initial capacities between the movable electrodes 32a and 32b and the fixed electrodes 34a and 34b are the same. Furthermore, ΔC is a change of the capacity value of the capacities between the movable electrodes 32a and 32b and the fixed electrodes 34a and 34b due to the change of the movable electrodes 32a and 32b.

In the gyro sensor 10, in the first structure 112, the signal processing is performed in which the output signal Sa of the first detection unit 30a is Sa=S1−S2. Thus, the output signal Sa of the first detection unit 30a is Sa=$(C_0+\Delta C)-(C_0-\Delta C)$=2×C. Furthermore, the signal processing is performed in which the output signal Sb of the second detection unit 30b is Sb=S4−S3. Thus, the output signal Sb of the second detection unit 30b is Sb=$(C_0-\Delta C)-(C_0+\Delta C)$=−2×ΔC.

Furthermore, in the gyro sensor 10, the signal processing is performed in which the output signal $S_A$ of the sensor element 100 of the first structure 112 is $S_A$=Sa−Sb. That is, a differential signal showing a difference between the output signal Sa of the first detection unit 30a and the output signal Sb of the second detection unit 30b is output. For that reason, the output signal $S_A$ of the sensor element 100 of the first structure 112 is $S_A$=(2×ΔC)−(−2×ΔC)=4×ΔC. In the sensor element 100 of the first structure 112, the angular velocity around the axis of the X axis can be detected from the output signal $S_A$. That is, it is possible to detect the angular velocity around the axis of the X axis only by the sensor element 100 of the first structure 112.

Similarly, in the gyro sensor 10, in the sensor element 100 of the second structure 212, the signal processing is performed in which the output signal Sc of the first detection unit 30a is Sc=S5−S6. Thus, the output signal Sc of the first detection unit 30a is Sc=−2×ΔC. Furthermore, the signal processing is performed in which the output signal Sd of the second detection unit 30b is Sd=S8−S7. Thus, the output signal Sd of the second detection unit 30b is Sd=2×ΔC.

Furthermore, in the gyro sensor 10, the signal processing is performed in which the output signal $S_B$ of the sensor element 100 of the second structure 212 is $S_B$=Sd−Sc. For that reason, the output signal $S_B$ of the sensor element 100 of the second structure 212 is $S_B$=(2×ΔC)−(−2×ΔC)=4×ΔC. In the sensor element 100 of the second structure 212, the angular velocity around the axis of the X axis can be detected from the output signal $S_B$. That is, it is possible to detect the angular velocity around the axis of the X axis only by the sensor element 100 of the second structure 212.

In addition, in the gyro sensor 10, the signal processing is performed in which the output signal S of the gyro sensor 10 is the sum of the output signal $S_A$ of the sensor element 100 of the first structure 112 and the output signal SB of the sensor element 100 of the second structure 212. That is, the signal processing is performed in which the output signal S of the gyro sensor 10 is S=$S_A+S_B$=(Sa−Sb)+(Sd−Sc). For that reason, in the state shown in FIGS. 4A and 4B, the output signal S of the gyro sensor 10 is S=8×ΔC. Thus, according to the gyro sensor 10 having two structures 112 and 212, the angular velocity around the axis of the X axis can be more precisely detected.

In addition, for example, when the angular velocity around the axis of the Z axis is input, the first detection mass unit 16a of the first structure 112 is displaced in the −Y axis direction, and the second detection mass unit 16b of the first structure 112 is displaced in the −Y axis direction. Furthermore, the first detection mass unit 16c of the second structure 212 is displaced in the +Y axis direction, and the second detection mass unit 16d of the second structure 212 is displaced in the +Y axis direction. In this state, the output signal Sa is Sa=S1−S2=$(C_0-\Delta C)-(C_0+\Delta C)$=−2ΔC, and the output signal Sb is Sb=S4−S3=$(C_0-\Delta C)-(C_0+\Delta C)$=−2ΔC. Thus, the output signal $S_A$ of the sensor element 100 of the first structure 112 is $S_A$=Sa−Sb=(−2×ΔC)−(−2×ΔC)=0. Similarly, the output signal $S_B$ of the sensor element 100 of the second structure 212 is $S_B$=Sd−Sc=(2×ΔC)−(2×ΔC)=0. Furthermore, the output signal S of the gyro sensor 10 is S=$S_A+S_B$=0. Thus, even when the angular velocity is input around the axis of the Z axis, all of the output signals S, $S_A$ and $S_B$ become 0, and thus the errors generated by the angular velocity around the axis of the Z axis can be cancelled.

Furthermore, when the acceleration in the Y axis direction is input, for example, the first detection mass unit 16a of the first structure 112 and the second detection mass unit 16b of the first structure 112 are displaced in the +Y axis direction. Furthermore, the first detection mass unit 16c of the second structure 212 and the second detection mass unit 16d of the second structure 212 are displaced in the +Y axis direction. Thus, the output signal $S_A$ of the sensor element 100 of the first structure 112 is $S_A$=Sa−Sb=(2×ΔC)−(2×ΔC)=0. Furthermore, the output signal $S_B$ of the sensor element 100 of the second structure 212 is $S_B$=Sd−Sc=(2×ΔC)−(2×ΔC)=0. Furthermore, the output signal S of the gyro sensor 10 is S=$S_A+S_B$=0. Thus, even when the angular velocity in the Y axis direction is input, all of the output signals S, $S_A$ and $S_B$ become 0, and thus the errors generated by the acceleration in the Y axis direction can be cancelled.

In this manner, in the gyro sensor 10, in the sensor element 100, by performing the above-mentioned signal processing, the errors generated by the angular velocity around the axis of the Z axis or the acceleration in the Y axis direction can be cancelled by the signal processing, and thus the detection accuracy of the angular velocity around the axis of the X axis can be increased.

For example, the gyro sensor 10 has the following characteristics.

According to the gyro sensor 10, the first vibrating body 40a and the second vibrating body 40b of the sensor element 100 can vibrated in the Z axis direction, along with the drive vibration in the X axis direction. For that reason, it is possible to detect the angular velocity around the axis of the X axis using the vibration in the Z axis direction of the vibrating bodies 40a and 40b as the drive vibration. Thus, by the use of the sensor element 100, the sensor element 100 adapted to detect the angular velocity around the axis of the X axis, the sensor element 200 adapted to detect the angular velocity around the axis of the Y axis, and the sensor element 300 adapted to detect the angular velocity around the axis of the Z axis can be operated by the same drive vibration (the vibration in the X axis direction). Thus, for example, since the drive unit 70 can be shared, there is no need to separate the drive circuit for each element, and the miniaturization of the device can be promoted. In addition, since the mounting area can be reduced, the miniaturization of the device can be promoted.

In the gyro sensor 10, the first vibrating body 40a is a cantilever support structure in which one end thereof is connected to the first detection mass unit 16a and extends in the −X axis direction, and the other end thereof is a free end. Furthermore, the second vibrating body 40b is a cantilever support structure in which one end thereof is connected to the second detection mass unit 16b and extends in the +X axis direction opposite to the extension direction of the first vibrating body 40a, and the other end thereof is a free end. For that reason, the first vibrating body 40a and the second vibrating body 40b vibrate at the phases that are opposite to each other. Thereby, the first detection mass unit 16a and the second detection mass unit 16b are displaced in the directions opposite to each other by the angular velocity around the axis of the X axis, and are displaced in the same direction by the angular velocity around the axis of the Z axis or the acceleration in the Y axis direction. Thus, the errors generated by the angular velocity around the axis of the Z axis or the acceleration in the Y axis direction can be cancelled by the signal processing, and the detection accuracy of the angular velocity around the axis of the X axis can be increased.

In the gyro sensor 10, the drive unit 70 vibrates the drive mass unit 14 of the first structure 112 and the drive mass unit 14 of the second structure 212 at the phases that are opposite to each other. Thereby, the Q value can be increased.

According to the gyro sensor 10, since the movable electrodes 32a and 32b and the fixed electrodes 34a and 34b are included, the angular velocity around the axis of the X axis can be detected from the change of the electrostatic capacity between the movable electrodes 32a and 32b and the fixed electrodes 34a and 34b. Thus, the angular velocity around the axis of the X axis can be sensitively detected.

In the gyro sensor 10, the first detection signals S1 and S2 fluctuating based on the displacement of the movable electrode 32a are output, the second detection signals S3 and S4 fluctuating based on the displacement of the movable electrode 32b are output, and the angular velocity around the axis of the X axis is detected based on the first detection signals S1 and S2 and the second detection signals S3 and S4. Thereby, the errors generated by the angular velocity around the axis of the Z axis or the acceleration in the Y axis direction can be cancelled, and the detection accuracy of the angular velocity around the axis of the X axis can be increased.

According to the gyro sensor 10, the detection unit is included which detects at least one of the angular velocity around the axis of the Y axis and the angular velocity around the axis of the Z axis. Thus, since the detection of the angular velocity around the axis of the X axis and the detection of the angular velocity around at least one axis of the Y axis and the Z axis can be performed by the drive vibration in the same X axis direction, it is possible to detect the angular velocity around the axis of other axes (the Y axis and the Z axis) in addition to the angular velocity around the axis of the X axis, while promoting the miniaturization.

According to the gyro sensor 10, the vibrating bodies 40a and 40b are provided with the frequency adjustment units 80a and 80b. Thus, the resonance frequency of the vibrating bodies 40a and 40b can be adjusted.

5. Modification Example

Next, a modification example of the embodiment will be described. In addition, points different from the above-mentioned gyro sensor 10 will be described, and the description of the same points are omitted.

5.1. Modification Examples of Vibrating Body

Figure 8A:
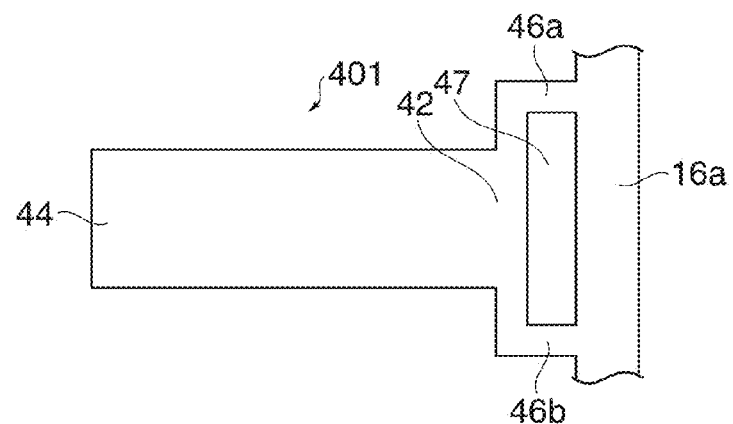
FIGS. 8A to 8D are views that schematically show Modification examples 1 to 4 of the vibrating body of the gyro sensor according to the embodiment.
Figure 8B:
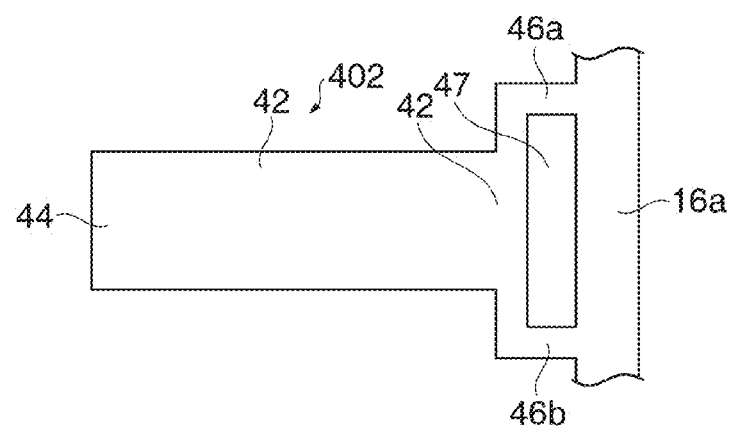

First, modification examples of the vibrating body of the gyro sensor according to the embodiment will be described. FIG. 8A is a plan view that schematically shows a vibrating body 401 according a first modification example. FIG. 8B is a plan view that schematically shows a vibrating body 402 according to a second modification example.

The vibrating body 401 and the vibrating body 402 connect the fixed end 42 and the detection mass unit 16a via the support portions 46a and 46b. The support portions 46a and 46b are formed to be thinner than the vibrating bodies 401 and 402. Furthermore, an opening 47 is provided between the fixed end 42 and the detection mass unit 16a. Thereby, the free end 44 can be easily vibrated.

Figure 8C:
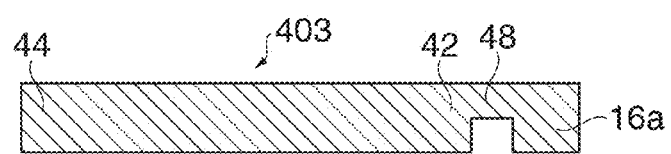

FIG. 8C is a cross-sectional view that schematically shows a vibrating body 403 according to a third modification example. In the vibrating body 403, a thin portion 48 having a small thickness is provided on the fixed end 42 side. Thereby, rigidity of the fixed end 42 side can be reduced and the free end 44 can be easily vibrated.

Figure 8D:
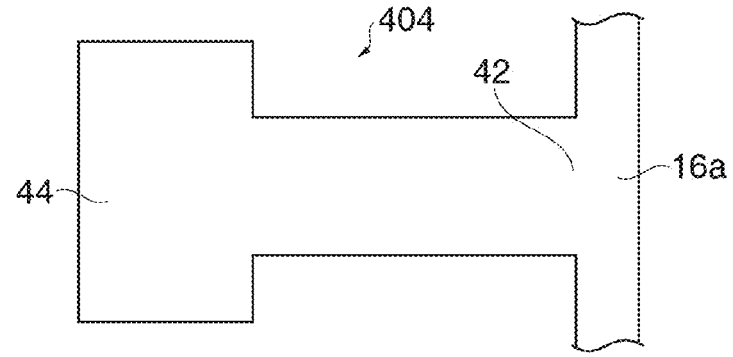

FIG. 8D is a plan view that schematically shows a vibrating body 404 according to a fourth modification example. In the vibrating body 404, the width of the free end 44 side is wider than that of the fixed end 42 side. Thereby, since it is possible to make the mass of the free end 44 side larger than the mass of the fixed end 42 side, the free end 44 can be easily vibrated with respect to the drive vibration.

Figure 9:
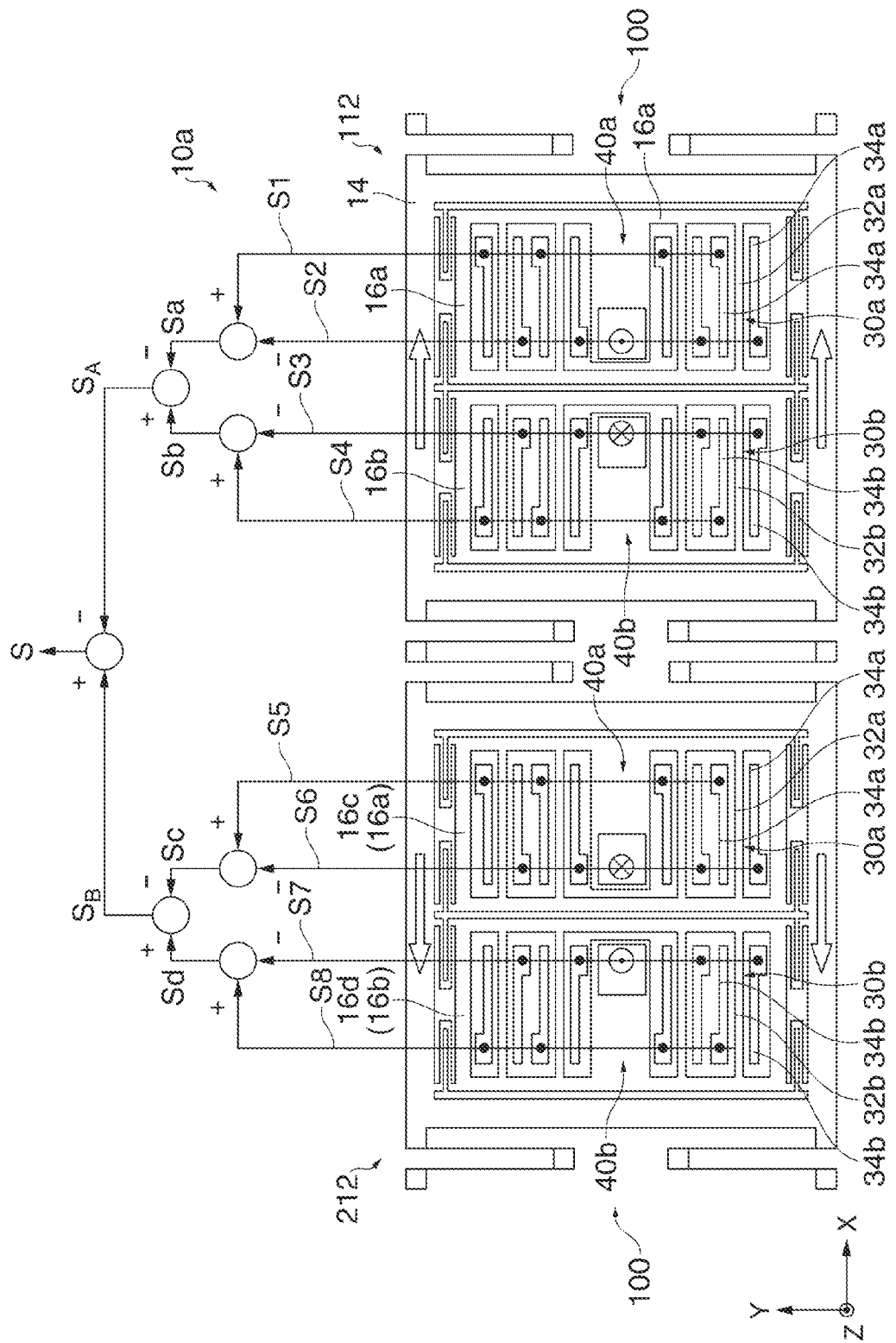
FIG. 9 is a view for describing the signal processing method of the gyro sensor according to Modification Example 1 of the embodiment.

5.2. Modification Examples of Signal Processing Method 5.2.1 First Modification Example Next, a first modification example of the signal processing method of the gyro sensor according to the embodiment will be described. FIG. 9 is a view for describing the signal processing method of a gyro sensor 10a according to a first modification example.

In the signal processing method of the above-mentioned gyro sensor 10, as shown in FIGS. 4A and 4B, in the first structure 112, the signal processing was performed in which the output signal Sa of the first detection unit 30a is Sa=S1−S2, the output signal Sb of the second detection unit 30b is Sb=S4−S3, and the output signal $S_A$ of the sensor element 100 is $S_A$=Sa−Sb. Furthermore, in the second structure 212, the signal processing was performed in which the output signal Sc of the first detection unit 30a is Sc=S5−S6, the output signal Sd of the second detection unit 30b is Sd=S8−S7, and the output signal $S_B$ of the sensor element 100 is $S_B$=Sd−Sc. In addition, the signal processing was performed in which the output signal S of the gyro sensor 10 is S=$S_A$+$S_B$.

On the contrary, in the example shown in FIG. 9, in the first structure 112, the signal processing is performed in which the output signal Sa of the first detection unit 30a is Sa=S1−S2, the output signal Sb of the second detection unit 30b is Sb=S4−S3, and the output signal $S_A$ of the sensor element 100 is $S_A$=Sb−Sa. Furthermore, in the second structure 212, the same signal processing as the gyro sensor 10 shown in FIGS. 4A and 4B is performed. In addition, the signal processing was performed in which the output signal S of the gyro sensor 10a is S=$S_B$−$S_A$. Thereby, like the gyro sensor 10 shown in FIGS. 4A and 4B, the errors generated by the angular velocity around the axis of the Z axis or the acceleration in the Y axis direction can be cancelled, and the detection accuracy of the angular velocity around the axis of the X axis can be increased. Hereinafter, the configuration will be specifically described.

In the state where the drive mass unit 14 of the first structure 112 is displaced in the +X axis direction and the drive mass unit 14 of the second structure 212 is displaced in −X axis direction, when the angular velocity is input around the axis of the X axis, for example, the first detection mass unit 16a of the first structure 112 is displaced in the +Y axis direction, and the second detection mass unit 16b of the first structure 112 is displaced in the −Y axis direction. Furthermore, the first detection mass unit 16c of the second structure 212 is displaced in the −Y axis direction, and the second detection mass unit 16d of the second structure 212 is displaced in the +Y axis direction.

In this state, in the first structure 112, the detection signal S1 is S1=$C_0$+ΔC, the detection signal S2 is S2=$C_0$-ΔC, the detection signal S3 is S3=$C_0$+ΔC, and the detection signal S4 is S4=$C_0$-ΔC. Furthermore, in the second structure 212, the detection signal S5 is S5=$C_0$-ΔC, the detection signal S6 is S6=$C_0$+ΔC, the detection signal S7 is S7=$C_0$-ΔC, and the detection signal S8 is S8=$C_0$+ΔC.

In the gyro sensor 10a, in the first structure 112, the signal processing is performed in which the output signal Sa is Sa=S1-S2, the output signal Sb is Sb=S4-S3, and the output signal $S_A$ is $S_A$=Sb-Sa. Thus, the output signal Sa is Sa=2×ΔC. Furthermore, the output signal Sb is Sb=-2×ΔC. Furthermore, the output signal $S_A$ is $S_A$=(-2×ΔC)-(2×ΔC)=-4×ΔC.

Like the example shown in FIGS. 4A and 4B, in the signal processing in the second structure 212, the output signal Sc is Sc=-2×ΔC, the output signal Sd is Sd=2×ΔC, and the output signal $S_B$ is $S_B$=4×ΔC.

In the gyro sensor 10a, the signal processing is performed in which the output signal S of the gyro sensor 10a is S=$S_B$-$S_A$. For that reason, in the state shown in FIG. 9, the output signal S of the gyro sensor 10a is S=$S_B$-$S_A$=(4×ΔC)-(-4×ΔC)=8×ΔC. Thus, according to the gyro sensor 10a having the two structures 112 and 212, the angular velocity around the axis of the X axis can be accurately detected.

In addition, for example, when the angular velocity around the axis of the Z axis is input, the first detection mass unit 16a of the first structure 112 is displaced in the -Y axis direction, and the second detection mass unit 16b of the first structure 112 is displaced in the -Y axis direction. Furthermore, the first detection mass unit 16c of the second structure 212 is displaced in the +Y axis direction, and the second detection mass unit 16d of the second structure 212 is displaced in the +Y axis direction. In this state, the output signal Sa is Sa=S1-S2=($C_0$-ΔC)-($C_0$+ΔC)=-2ΔC, and the output signal Sb is Sb=S4-S3=($C_0$-ΔC)-($C_0$+ΔC)=-2ΔC. Furthermore, the output signal $S_A$ is $S_A$=Sb-Sa=(-2×ΔC)-(-2×ΔC)=0. Similarly, the output signal $S_B$ of the sensor element 100 of the second structure 212 is $S_B$=Sd-Sc=(2×ΔC)-(2×ΔC)=0. Furthermore, the output signal S of the gyro sensor 10a is S=$S_A$+$S_B$=0. Thus, even when the angular velocity is input around the axis of the Z axis, all of the output signals S, $S_A$ and $S_B$ become 0, and thus the errors generated by the angular velocity around the axis of the Z axis can be cancelled.

Furthermore, when the acceleration in the Y axis direction is input, for example, the first detection mass unit 16a of the first structure 112 and the second detection mass unit 16b of the first structure 112 are displaced in the +Y axis direction. Furthermore, the first detection mass unit 16c of the second structure 212 and the second detection mass unit 16d of the second structure 212 are displaced in the +Y axis direction. Thus, the output signal $S_A$ of the sensor element 100 of the first structure 112 is $S_A$=Sb-Sa=0. Furthermore, the output signal $S_B$ of the sensor element 100 of the second structure 212 is $S_B$=Sd-Sc=0. Furthermore, the output signal S of the gyro sensor 10a is S=$S_A$+$S_B$=0. Thus, even when the angular velocity in the Y axis direction is input, all of the output signals S, $S_A$ and $S_B$ become 0, and thus the errors generated by the acceleration in the Y axis direction can be cancelled.

In this manner, in the gyro sensor 10a, like the example of the gyro sensor 10 shown in FIGS. 4A and 4B, by performing the above-mentioned signal processing, the errors generated by the angular velocity around the axis of the Z axis or the acceleration in the Y axis direction can be cancelled by the signal processing, and thus the detection accuracy of the angular velocity around the axis of the X axis can be increased.

5.2.2. Second Modification Example

Figure 10:
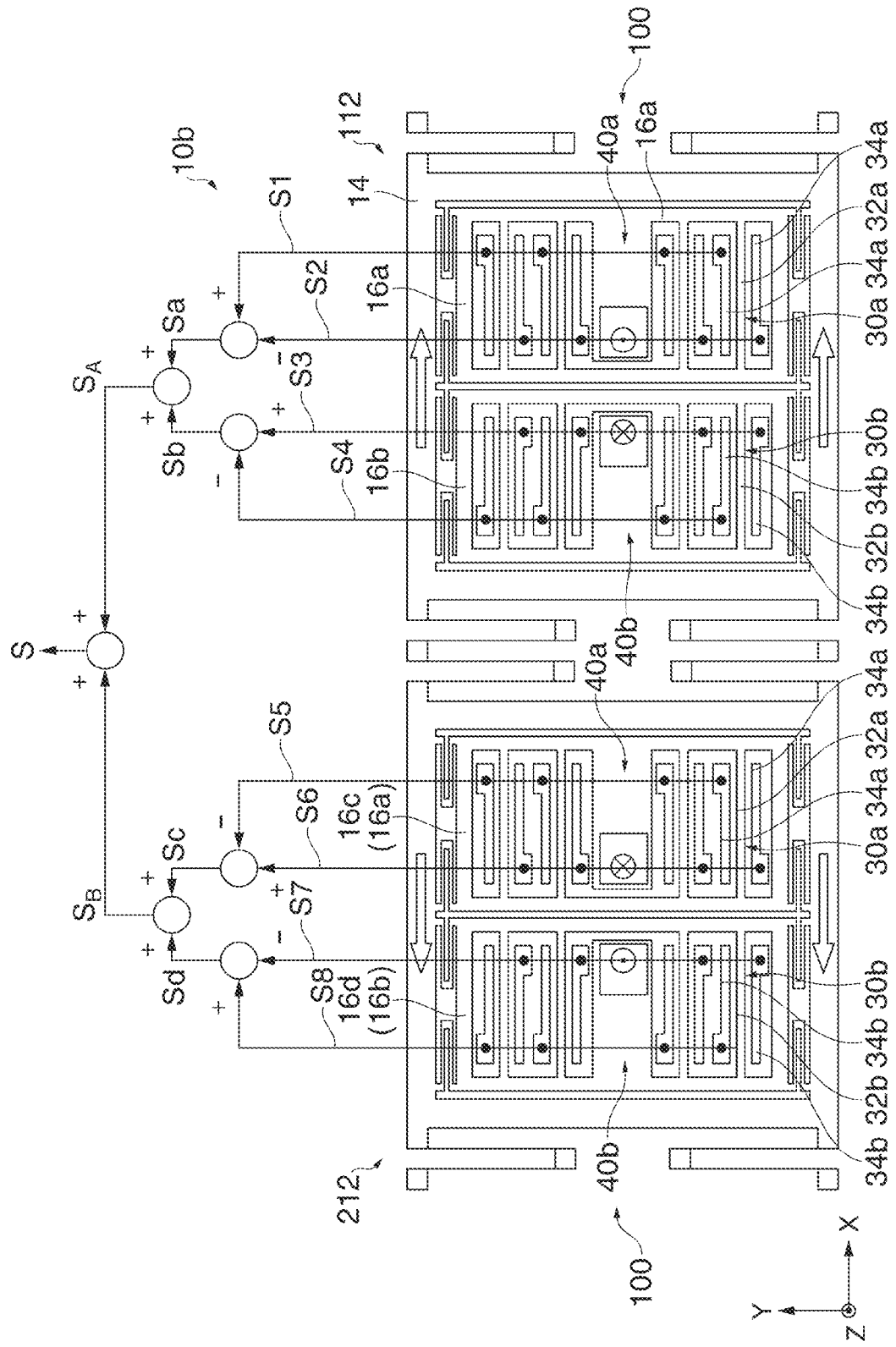
FIG. 10 is a view for describing the signal processing method of the gyro sensor according to Modification Example 2 of the embodiment.

Next, a second modification example of the signal processing method of the gyro sensor according to the embodiment will be described. FIG. 10 is a view for describing the signal processing method of the gyro sensor 10b according to the second modification example.

In the single processing method of the gyro sensor 10b, as shown in FIG. 10, in the first structure 112, the signal processing is performed in which the output signal Sa of the first detection unit 30a is Sa=S1-S2, the output signal Sb of the second detection unit 30b is Sb=S3-S4, and the output signal $S_A$ of the sensor element 100 is $S_A$=Sa+Sb. Furthermore, in the second structure 212, the signal processing is performed in which the output signal Sc of the first detection unit 30a is Sc=S6-S5, the output signal Sd of the second detection unit 30b is Sd=S8-S7, and the output signal $S_B$ of the sensor element 100 is $S_B$=Sc+Sd. In addition, the signal processing was performed in which the output signal S of the gyro sensor 10b is S=$S_A$+$S_B$. Thereby, like the examples of the gyro sensors 10 and 10a, the errors generated by the angular velocity around the axis of the Z axis or the acceleration in the Y axis direction can be cancelled, and the detection accuracy of the angular velocity around the axis of the X axis can be increased.

In addition, the signal processing methods of the gyro sensor are not particularly limited, if the errors generated by the angular velocity around the axis of the Z axis or the acceleration in the Y axis direction can be cancelled and the angular velocity around the axis of the X axis can be detected.

6. Electronic Apparatus

Next, an electronic apparatus according to an embodiment will be described referring to the drawings. The electronic apparatus according to the embodiment includes the gyro sensor according to the embodiment of the invention. Hereinafter, the electronic apparatus including the gyro sensor 10 as the gyro sensor according to the embodiment of the invention will be described.

Figure 11:
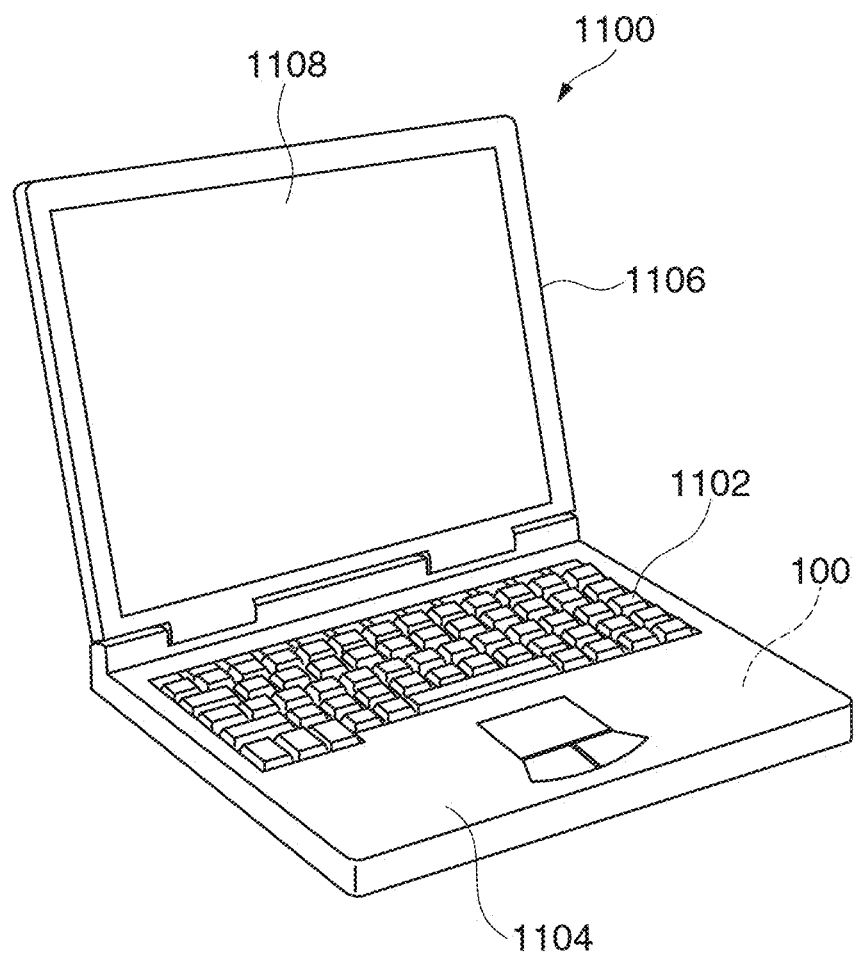
FIG. 11 is a perspective view that schematically shows an electronic apparatus according to an embodiment.

FIG. 11 is a perspective view that schematically shows a mobile type (or a notebook type) personal computer 1100 as the electronic apparatus according to the embodiment.

As shown in FIG. 11, the personal computer 1100 is constituted by a main body portion 1104 including a keyboard 1102, and a display unit 1106 including a display portion 1108, and the display unit 1106 is rotatably supported with respect to the main body portion 1104 via a hinge structure portion.

Such a personal computer 1100 is equipped with the gyro sensor 10.

Figure 12:
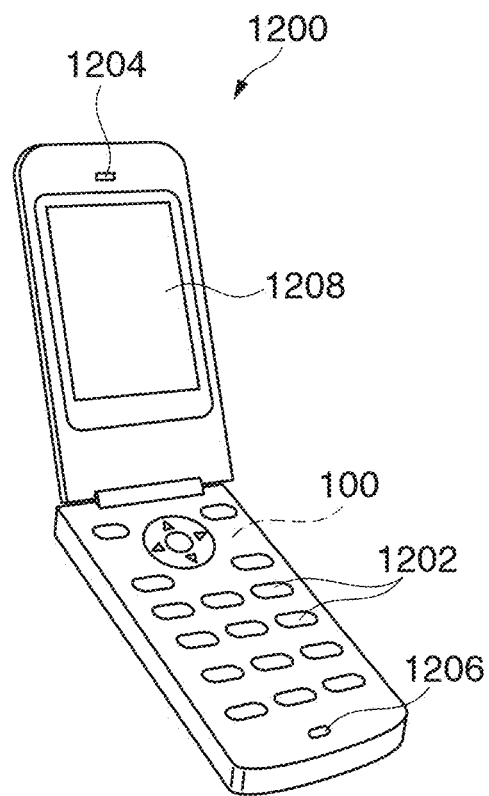
FIG. 12 is a perspective view that schematically shows an electronic apparatus according to an embodiment.

FIG. 12 is a perspective view that schematically shows a configuration of a mobile phone (also including PHS) 1200 as an electronic apparatus according to an embodiment.

As shown in FIG. 12, the mobile phone 1200 includes a plurality of operation buttons 1202, an ear piece 1204, and a mouth piece 1206, and a display portion 1208 is placed between the operation buttons 1202 and the ear piece 1204.

Such a mobile phone 1200 is equipped with the gyro sensor 10.

Figure 13:
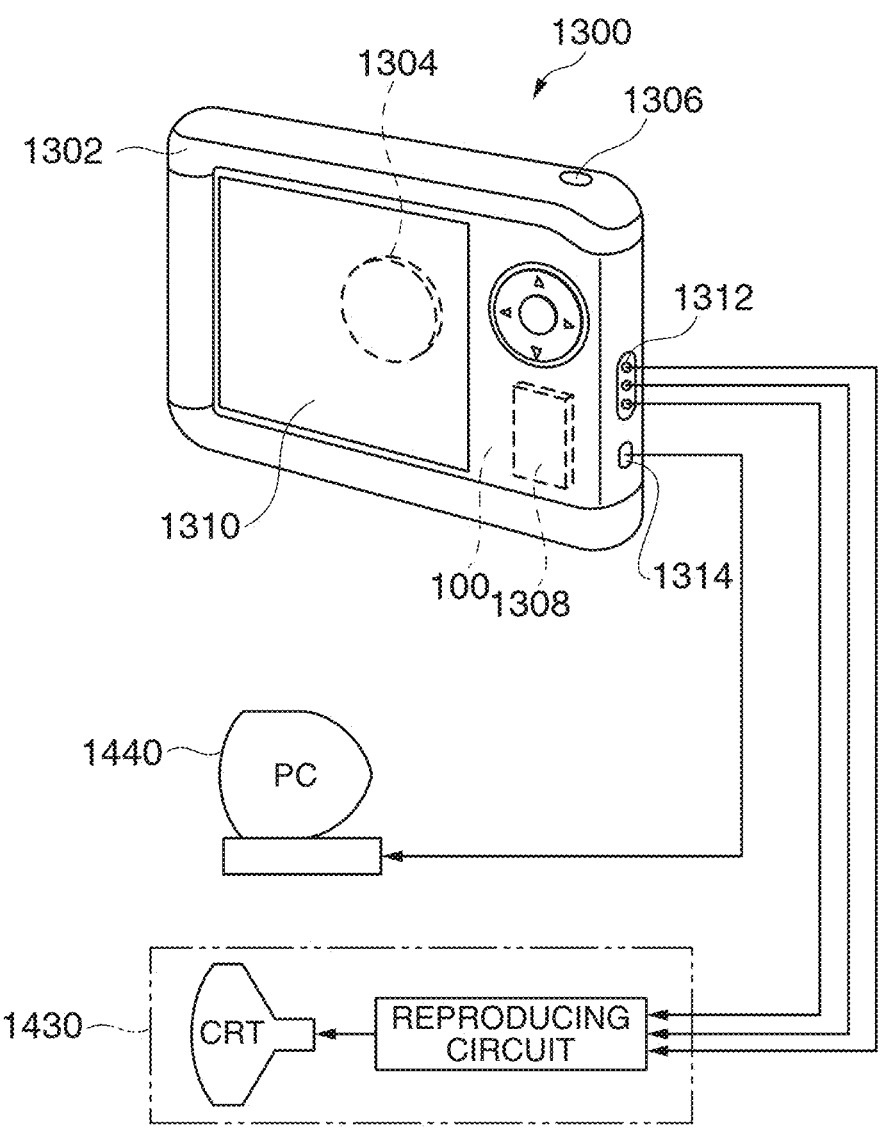
FIG. 13 is a perspective view that schematically shows an electronic apparatus according to an embodiment.

FIG. 13 is a perspective view that schematically shows a digital camera 1300 as an electronic apparatus according to an embodiment. In addition, in FIG. 13, the connection with an external apparatus is also simply shown.

Herein, a normal camera exposes silver halide photography to light by a photo image of a subject, and meanwhile, the digital camera 1300 performs the photoelectric conversion of the optical image of the subject using an image pickup device such as CCD (Charged Coupled Device) to generate the image pickup signal (the image signal).

The display portion 1310 is provided on the back surface of a case (a body) 1302 in the digital camera 1300, the display is performed based on the image pickup signal using the CCD, and the display portion 1310 functions as a finder that displays the subject as an electronic image.

Furthermore, on a front side (a rear surface side in FIG. 13) of the case 1302, a light receiving unit 1304 including an optical lens (an image pickup optical system), a CCD or the like is provided.

When a photographer confirms the subject image displayed on the display portion 1310 and presses a shitter button 1306 down, the image pickup signal of the CCD at that time point is transmitted to and stored in a memory 1308.

Furthermore, in the digital camera 1300, on the side surface of the case 1302, a video signal output terminal 1312 and an input and output terminal 1314 for data communication are provided. Moreover, as shown, a television monitor 1430 is connected to the video signal output terminal 1312, and a personal computer 1440 is connected to the input and output terminal 1314 for data communication, as needed, respectively. In addition, there is provided a configuration in which the image pickup signal stored in the memory 1308 is output to the television monitor 1430 and the personal computer 1440 by the predetermined operation.

The digital camera 1300 is equipped with the gyro sensor 10.

Such electronic apparatuses 1100, 1200 and 1300 include the gyro sensor 10 capable of promoting the miniaturization. For that reason, the electronic apparatuses 1100, 1200, and 1300 can promote the miniaturization.

In addition, the electronic apparatus including the above-mentioned gyro sensor 10 can also be applied to, for example, an ink jet type discharge device (for example, an ink jet printer), a laptop type personal computer, a television, a video camera, a video tape recorder, various navigation devices, a pager, an electronic organizer (also including a communication function), an electronic dictionary, an electronic calculator, an electronic game device, a head mount display, a word processor, a workstation, a videophone, a television monitor for crime prevention, an electronic binoculars, a POS terminal, a medical device (for example, an electronic thermometer, a sphygmomanometer, a blood glucose monitoring system, an electrocardiogram measurement device, an ultrasonic diagnostic device, and an electronic endoscope), a fish finder, various measurement devices, meters (for example, meters of a vehicle, an airplane, and a vessel), a flight simulator or the like, in addition to the personal computer (a mobile type personal computer) shown in FIG. 11, the mobile phone shown in FIG. 12, and the digital camera shown in FIG. 13.

The invention includes the configurations (for example, the configurations in which the function, the method, and the result are the same, or the configurations in which the object and the effect are the same) that is substantially the same as the configuration described in the embodiments. Furthermore, the invention includes the configurations in which the inessential portions of the configurations described in the embodiments are replaced. Furthermore, the invention includes the configurations having the same effects as the configurations described in the embodiments or the configurations capable of achieving the same object. Furthermore, the invention includes the configurations in which the known techniques are added to the configurations described in the embodiments.

The entire disclosure of Japanese Patent Application No. 2012-089058, filed Apr. 10, 2012 is expressly incorporated by reference herein.

What is claimed is:

1. A gyro sensor that includes a structure, the structure comprising:
    a drive mass unit;
    a drive unit that drives the drive mass unit in a direction of a first axis;
    a first detection mass unit that is provided with a first detection unit and a first vibrating body, and is connected to the drive mass unit, via a first elastic portion capable of being displaced in a direction of a second axis perpendicular to the first axis; and
    a second detection mass unit that is provided with a second detection unit and a second vibrating body, and is connected to the drive mass unit, via a second elastic portion capable of being displaced in the direction of the second axis,
    wherein the first vibrating body extends in the direction of the first axis, and one end thereof is connected to the first detection mass unit,
    the second vibrating body extends in a direction that is opposite to an extension direction of the first vibrating body, and one end thereof is connected to the second detection mass unit, and
    a free end of the first vibrating body and a free end of the second vibrating body vibrate in a direction of a third axis perpendicular to the first axis and the second axis, along with the vibration in the direction of the first axis.

2. The gyro sensor according to claim 1,
    wherein two structures are placed in the direction of the first axis,
    the two structures are connected to each other by a connecting elastic portion, and
    the drive unit vibrates the drive mass units of the two structures at phases opposite to each other.

3. The gyro sensor according to claim 1,
    wherein the first detection mass unit and the second detection mass unit are displaced in the directions opposite to each other by the angular velocity around the axis of the first axis, and are displaced in the same direction by the acceleration in the direction of the second axis or by the angular velocity around the axis of the third axis.

4. The gyro sensor according to claim 1,
    wherein the drive mass unit is provided at a predetermined distance from a substrate, and
    the drive mass unit includes
        a first fixed substrate fixed to the substrate, and
        a second fixed substrate fixed to the substrate.

5. The gyro sensor according to claim 1, which
    outputs a first detection signal that fluctuates based on the displacement of the first detection unit,
    outputs a second detection signal that fluctuates based on the displacement of the second detection unit, and
    detects the angular velocity around the axis of the first axis, based on the first detection signal and the second detection signal.

6. The gyro sensor according to claim 1,
    wherein the structure has a third detection unit that detects the angular velocity around the axis of the second axis or the angular velocity around the axis of the third axis.

7. The gyro sensor according to claim 1,
wherein a frequency adjustment unit is provided in the first vibrating body or the second vibrating body.

8. An electronic apparatus comprising the gyro sensor according to claim 1;
wherein the electronic apparatus is a mobile personal computer, a mobile phone, or a digital camera.

9. An electronic apparatus comprising the gyro sensor according to claim 2;
wherein the electronic apparatus is a mobile personal computer, a mobile phone, or a digital camera.

10. An electronic apparatus comprising the gyro sensor according to claim 3;
wherein the electronic apparatus is a mobile personal computer, a mobile phone, or a digital camera.

11. An electronic apparatus comprising the gyro sensor according to claim 4;
wherein the electronic apparatus is a mobile personal computer, a mobile phone, or a digital camera.

12. An electronic apparatus comprising the gyro sensor according to claim 5;
wherein the electronic apparatus is a mobile personal computer, a mobile phone, or a digital camera.

13. An electronic apparatus comprising the gyro sensor according to claim 6;
wherein the electronic apparatus is a mobile personal computer, a mobile phone, or a digital camera.

14. An electronic apparatus comprising the gyro sensor according to claim 7;
wherein the electronic apparatus is a mobile personal computer, a mobile phone, or a digital camera.

\* \* \* \* \*